United States Patent [19]

Ozawa et al.

[11] Patent Number: 5,781,523
[45] Date of Patent: Jul. 14, 1998

[54] DISK REPRODUCING APPARATUS CAPABLE OF TAKING MULTI-INCLINED POSTURES

[75] Inventors: Tsugutaro Ozawa, Mito; Shinro Inui, Hitachinaka, both of Japan

[73] Assignee: Hitachi, Ltd., Tokyo, Japan

[21] Appl. No.: 626,998

[22] Filed: Apr. 3, 1996

[30] Foreign Application Priority Data

| Apr. 5, 1995 | [JP] | Japan | 7-080426 |
| Aug. 30, 1995 | [JP] | Japan | 7-221426 |

[51] Int. Cl.$^6$ .............. G11B 17/28; G11B 17/04
[52] U.S. Cl. .............. 369/77.1; 369/37; 369/75.2
[58] Field of Search .............. 369/77.1, 75.1, 369/75.2, 191, 192, 36, 37; 360/98.04, 98.05, 98.06

[56] References Cited

U.S. PATENT DOCUMENTS

| 4,635,150 | 1/1987 | Kato et al. | 369/37 |
| 4,680,748 | 7/1987 | Kobayashi | 369/77.1 |
| 4,701,899 | 10/1987 | d'Alayer de Costemore d'Arc | 369/36 |
| 4,862,445 | 8/1989 | Sasaki | 369/75.2 |
| 5,036,509 | 7/1991 | Kobayashi et al. | 369/77.1 |
| 5,493,551 | 2/1996 | Kidd | 369/77.1 |

FOREIGN PATENT DOCUMENTS

| 2-273371 | 11/1990 | Japan. |
| 3-83262 | 4/1991 | Japan. |

*Primary Examiner*—Stuart S. Levy
*Assistant Examiner*—Kevin M. Watkins
*Attorney, Agent, or Firm*—Antonelli, Terry, Stout, & Kraus, LLP

[57] ABSTRACT

A disk reproducing apparatus comprise a main body of a stock portion in which a plurality of disks are stored in a laminar form, the body being arranged within a casing un-removably from the casing under a normal use state, and a drawer having a disk mount portion on which a single disk is disposed and mounted to the casing in such a manner as to be drawn out from/inserted into the casing of between a first position on an outside of the casing and a second position within the casing under a state where the disk is disposed on the mount portion, so that the disk on the mount of the drawer is delivered to the stock portion. The disk reproducing apparatus is arranged such that when the drawer is in the second position, the drawer can take plural inclined postures of a plurality of kinds of angles with respect to a main chassis of the apparatus provided within and fixed to the casing, whereby it is possible to minimize vertical movement or motion of the stock portion required for transfer of the disk between the stock portion and the disk mount portion of the drawer.

6 Claims, 21 Drawing Sheets

DISK REPRODUCING APPARATUS CAPABLE OF TAKING MULTI-INCLINED POSTURES

BACKGROUND OF THE INVENTION

Field of the Invention

The present invention relates to a disk reproducing apparatus and, more particularly, to a disk reproducing apparatus which stores therein a plurality of disks, and which is capable of alternatively reproducing the disks.

The prior art includes two kinds of such disk reproducing apparatus. A first kind of disk reproducing apparatus is arranged such that a magazine in which a plurality of disks are stored in a laminar or layer form is detachable with respect to a casing of the reproducing apparatus, that storing, taking-out, change or replacement, and the like of the disks are executed under a state in which the magazine is taken out from the casing, that the magazine is thereafter mounted on the housing, and that a desired disk is alternatively reproduced from the disks which are stored in the magazine. A second kind of reproducing apparatus is so arranged as to have a body of a stock portion in which a plurality of disks are stored in a laminar or layer form, the body being mounted within the casing un-removably from the casing under a normal use state, and a drawer provided with a disk mount on which a single disk is mounted, the drawer being mounted to the casing so as to be drawn into/out of the casing of the reproducing device under a state in which the disk is mounted on the mount, the disk on the mount of the drawer being delivered to/from the stock.

The invention relates to the latter of the above-described two kinds of disk reproducing apparatuses, that is, the second kind of disk reproducing apparatus.

RELATED ART

Conventionally, disk reproducing apparatuses each of which stores a plurality of compact disks, principally, for audio and each of which selectively reproduces one of them have been merchandised in the form of various systems. Of them, a system based on Japanese Patent Unexamined Publication No. 3-83262(A) (83262/1991) has widely been accepted as a system which has acquired a convenience in use equivalent to a reproducing device, for a single disk, i.e. without the stock portion.

As shown in FIGS. 38–40, the system is arranged as follows. That is, a plurality of disks 105A, 105B and 105C are loaded respectively on trays 101A, 101B and 101C one by one, and a stocker 102 in which these disks are coaxially positioned is moved vertically together with all the disks. The stocker 102 is moved vertically, and a height of a desired disk is caused to be equal to a height for horizontal carriage. A disk, e.g. disk 105A, is carried to a position of reproducing device 103, together with the tray, by a drawer 104. Further, one of the disks is carried out to the outside of the device, together with the tray, by the drawer 104.

FIG. 38 shows a state where the disk 105A is mounted or placed on the tray 101A on the drawer 104 drawn out of a casing of the apparatus. In this case, the arrangement is such that the disk 105A is transferred horizontally together with the tray 101A, and is stored in the lowermost stage of the stocker 102. Moreover, FIG. 39 shows a state in which the reproducing device 103 is reproducing the disk 105A of the lowermost stage. FIG. 40 shows a state in which the disk 105C of the uppermost stage is being reproduced by the reproducing device 103.

A disk selection system shown in FIGS. 38–40 necessitates a dimension or size of the whole apparatus about twice the stocker in a thickness direction (vertical direction), in order to move vertically the stocker 102 on which (all) the disks are loaded. Thus, there is a limitation, as a matter of course, in order to reduce the vertical size of the mechanism, to make an attempt to reduce the size of the apparatus.

Accordingly, a technical problem to be solved of the invention is to dissolve the point, at issue, of the above-described prior art, and an object of the invention is to realize, in a disk reproducing apparatus in which a plurality of disks are so stored as to be alternatively reproducible, a mechanism which is smaller in vertical size than the conventional system in which the disk storage is moved vertically.

In the meantime, in a multi CD player, a disk selection mechanism per se is disclosed in Japanese patent Unexamined Publication No. 2-273371(A) (2273371/1990), in which a magazine (1) is so arranged as to be supported under a fixture state on a magazine holder (2) which is angularly movable around a pivot (5) with respect to a chassis (4), and a disk player and a disk player chassis (3) are coupled to the magazine holder (2) through a link mechanism (7, 8) so as to avoid vertical movement of the magazine or integral vertical movement of a disk level retracting mechanism and a disk player (reference numerals in the parentheses are those which are used in the drawings of the publication). However, the publication does not disclose a drawer for use in taking in and out the disk, nor suggest whether or not the multi CD player is concerned with the aforesaid second kind of reproducing apparatus.

SUMMARY OF THE INVENTION

In order to achieve the above-described object, according to the invention, there is provided a disk reproducing apparatus comprising a casing, a main chassis provided within the casing and fixed to the casing, a drawer mounted on the main chassis so as to be translatable between a first position on an outside of the casing and a second position within the casing, the drawer being provided with a disk mount portion where, when it is in the first position, the disk is mounted/taken out, wherein, when the drawer is in the second position, the disk mount portion is adapted to be able to take inclined postures of a plurality of kinds of angles with respect to the main chassis.

Herein, the disk may be an optical disk such as a compact disk (e.g., CD for audio or CD-ROM), magneto-optical disk and PD (e.g., a phase-changeable disk. However, the disk may be a disk of another type.

Since the disk reproducing apparatus is arranged such that, when the drawer is in the second position, the disk mount portion can take the inclined postures of the plurality of kinds of angles with respect to the main chassis, it is not necessary to move vertically, over the whole height of the tray support, a stock portion having a tray support portion which delivers/receives the disk to/from the disk mount portion of the drawer.

More specifically, according to the invention, in order to achieve the aforesaid object, there is provided a disk reproducing apparatus comprising a casing, a main chassis provided within the casing and fixed to the casing, a drawer mounted on the main chassis to be translationally between a first position on an outside of the casing and a second position within the casing, the drawer having a disk mount portion, which a disk is disposed (or mounted) on/taken out when the drawer is in the first position, a stock portion capable of storing therein a plurality of disks in a laminar form in a thickness direction of the disks at a location adjacent to the second position, and disk moving or transferring means for moving or transferring the disk from the disk mount portion to the stock portion at an angle equal to the inclined angle of the disk mount portion in a case where the drawer is in the second position under a state where the disk is mounted or disposed on the disk mount portion, and for moving or transferring the disk from the stock portion to the disk mount portion at an angle equal to the inclined angle of the disk mount portion in a case where the drawer is in the second position under a state where the disk is not mounted or disposed on the disk mount portion, wherein, when the drawer is in said second position, the disk mount portion of the drawer can take plural inclined postures (of a respective plurality of kinds of angles) with respect to the main chassis.

Herein, the disk moving or transferring means refers to any type of means which can transfer or delivery/receive the disk between the disk mount portion of the drawer and the disk support portion of the stock portion by translationally moving the disk. As far as the means can execute such transfer or delivery/reception, the means may basically be of any mechanical, or electrical and electro-mechanical structure. In addition, upon the transfer of the disks, at least one of the disk mount portion of the drawer and the disk support portion of the stock may be moved partially or entirely along a transfer path. Moreover, another transfer mechanism which performs additional or supplemental transfer may be provided in the intermediate path thereof. Furthermore, the disk support portion of the stock portion may not only be a stock tray on which the disk is disposed or mounted as an illustrated example to be described later, but also be a kind of hole into which the disk is inserted or projections (on opposed inner walls of the stock portion) on which the disk is supported on opposite sides. In this connection, the tray may include a fork-shaped or finer-shaped tray.

In a disk reproducing device according to a first preferred embodiment of the invention, the stock portion is arranged such that the disks are stored radially to converge toward the first position, as viewed from a side elevation.

Thus, since vertical movement of the stock portion serving as the disk storage can be eliminated, a vertical outer size of the disk reproducing apparatus can be minimized.

Preferably, the disk reproducing apparatus according to the first embodiment has disk reproducing means for reproducing the disk when the drawer is present in the second position. The disk reproducing means is so arranged as to be able to be selectively inclined to an inclined angle equal to one of the plural kinds of inclined angles taken by the disk mount portion of the drawer in the second position. The disk reproducing means adapted to reproduce the disk as the disk is, under the inclined state, in the second position or a position between the second position and the stock portion.

The disk reproducing means herein refers to any means or device of any structure as far as the disk reproducing means normally includes a pickup for picking out information on the disk, an element like a turntable for rotating the disk, and a moving mechanism for the head, for accessing a head of the pickup to a desired range or region of the disk.

Moreover, in the disk reproducing apparatus according to the first embodiment, the disk moving or transferring means preferably includes a plural stock trays each capable of carrying thereon a disk within the stock portion, said each stock tray being translationally movable in a direction parallel to a plane of the one disk thereon between the position within the stock portion and the second position such that the disks on the stock trays within the stock portion being divergent toward side opposite to the second position. More preferably, the disk mount portion of the drawer and the stock tray have such shapes that they are not overlapped each other in an axial direction of the disk, when the disk mount portion of the drawer and the stock tray of the stock portion are present in the second position under a state of the same inclined angle. The disk mount is translationally moved or translated in the axial direction of the disk relative to the tray, between a position in which a disk mounting surface of the disk mount portion of the drawer is higher than a disk mounting surface of the stock tray of the stock portion and a position in which the disk mounting surface of the disk mount portion of the drawer is lower than the disk mounting surface of the stock tray so that delivering receiving of the disk are performed between the disk mount portion of the drawer and the stock tray.

Meanwhile, in a disk reproducing apparatus according to a preferred second embodiment of the invention, the stock portion comprises a stocker movable angularly or pivotally with respect to the main chassis so as to change an inclined angle, relative to the main chassis, of the disk stored therein, and at least one of portions of the stocker in which the disks are stored in a laminar form or are to be stored in a laminar form performs the delivering/receiving or transfer of the disks with respect to the disk mont portion at the same inclined posture as the disk mount portion of said drawer.

Thus, in the disk reproducing apparatus according to the second embodiment of the invention, a region required for movement of the stocker serving as the disk storage in the second kind of disk reproducing apparatus can be reduced.

Preferably, the disk reproducing device according to the second embodiment comprises disk reproducing means for reproducing the disk when the drawer is present in the second position, wherein the disk reproducing means can be inclined to an inclined posture equal to plural kinds of inclined postures which the drawer takes in the second position, and the disk located at the second position is reproduced as the disk is under the inclined state.

Further, in the disk reproducing device according to the second embodiment, preferably, the stocker has plural stock trays each capable of carrying thereon one the disk, each of the stock trays being translationally movable, in a plane of the carried or mounted disk, between an interior of the stocker and said second position. More preferably, the disk mount portion and the stock tray have such shapes that they are not overlapped each other in the axial direction of the disks, when the disk mount portion of the drawer and the stock tray are in the second position under a state of the same inclined angle. The disk mount portion is translationally movable in the axial direction of the disk relative to the stock tray between a position where a disk mounting surface of the disk mount portion of the drawer is higher than a disk mounting or supporting surface of the stock tray and a position where the disk mounting surface of the disk mount portion of the drawer is lower than the disk mounting surface of the stock tray, so that delivering receiving or transfer of the disk is performed between the disk mount portion of the drawer and the stock tray.

Furthermore, in the disk reproducing apparatus according to the second embodiment, preferably, the drawer and the stocker have respective centers of angular or pivotal movement at heights or levels substantially half their heights, and the two centers of angular or pivotal movement are positioned substantially at the same height or level with respect to the main chassis.

Further, according to the invention, in order to achieve the aforesaid object, there is provided a disk reproducing apparatus comprising a casing, a main chassis provided within the casing and fixed to the casing, a drawer mounted on the main chassis to be translationally movable between a first position on an outside of the casing and a second position within the casing, the drawer having a disk mount portion which the disk is disposed or mounted on taken out when the drawer is in the first position, and a stock portion capable of storing therein plural disks in a laminar form with minimum spacing or gap therebetween in a thickness direction of the disks at a location adjacent to the second position, wherein, when the drawer is in the second position, the disk mount portion of the drawer can take plural inclined postures of respective plural kinds of angles with respect to the main chassis, whereby, in a case where the drawer is in the second position under a state where the disk is disposed or mounted on the disk mount portion, the disk is moved or transferred from the disk mount portion to the stock portion at an angle equal to the inclined angle of the disk mount portion, and in a case where the drawer is in the second position under a state where the disk is not disposed or mounted on the disk mount portion, the disk is moved or transferred from the stock portion to the disk mount portion at an angle equal to the inclined angle of the disk mount portion.

Moreover, according to the invention, in order to achieve the aforesaid object, there is provided a disk reproducing apparatus comprising a casing, a main chassis provided within the casing and fixed to the casing, a drawer mounted on the main chassis to be translationally movable between a first position on an outside of the casing and a second position within the casing, the drawer having a disk mount portion which the disk is disposed or mounted on taken out when it is in the first position, and a stock portion capable of storing therein plural disks in a laminar form (with a minimum spacing or gap therebetween) in a thickness direction of the disks at a location adjacent to the second position, wherein, when the drawer is in the second position, the disk mount portion of the drawer can take plural inclined postures of respective plural kinds of angles with respect to the main chassis, and wherein the apparatus further comprises a moving mechanism for translationally moving the disk mount portion of the drawer in a direction perpendicular to and/or in parallel to a disk supporting or mounting surface of the stock portion such that, in a case where the drawer is in the second position under a state where the disk is mounted or disposed on the disk mount portion, the disk is moved or transferred from the disk mount portion to the stock portion at an angle equal to the inclined angle of the disk mount portion, and in a case where the drawer is in the second position under a state where the disk is not mounted on the disk mount portion, the disk is moved or transferred from the stock portion to the disk mount portion at an angle equal to the inclined angle of the disk mount portion.

DETAILED DESCRIPTION OF THE PREFERRED EMBODIMENTS

A disk reproducing apparatus according to a first preferred embodiment of the invention will subsequently be described with reference to FIGS. 1–22. The present embodiment is an example which is applied to a disk reproducing apparatus where three compact disks can be treated or handled.

Figure 2:
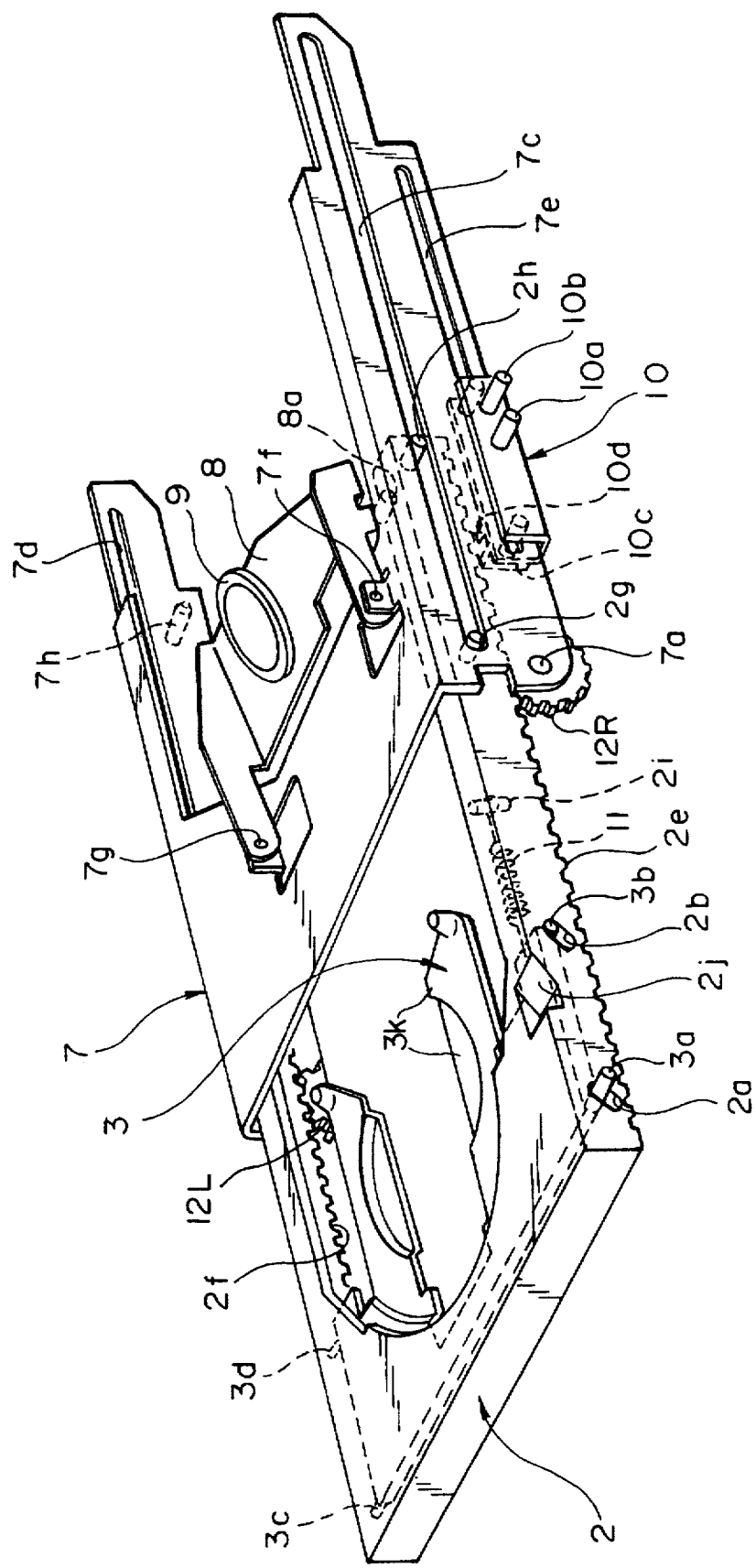
FIG. 2 is an exploded perspective view, showing principally a drawer and a sub-chassis, of the disk reproducing apparatus in FIG. 1.
Figure 3:
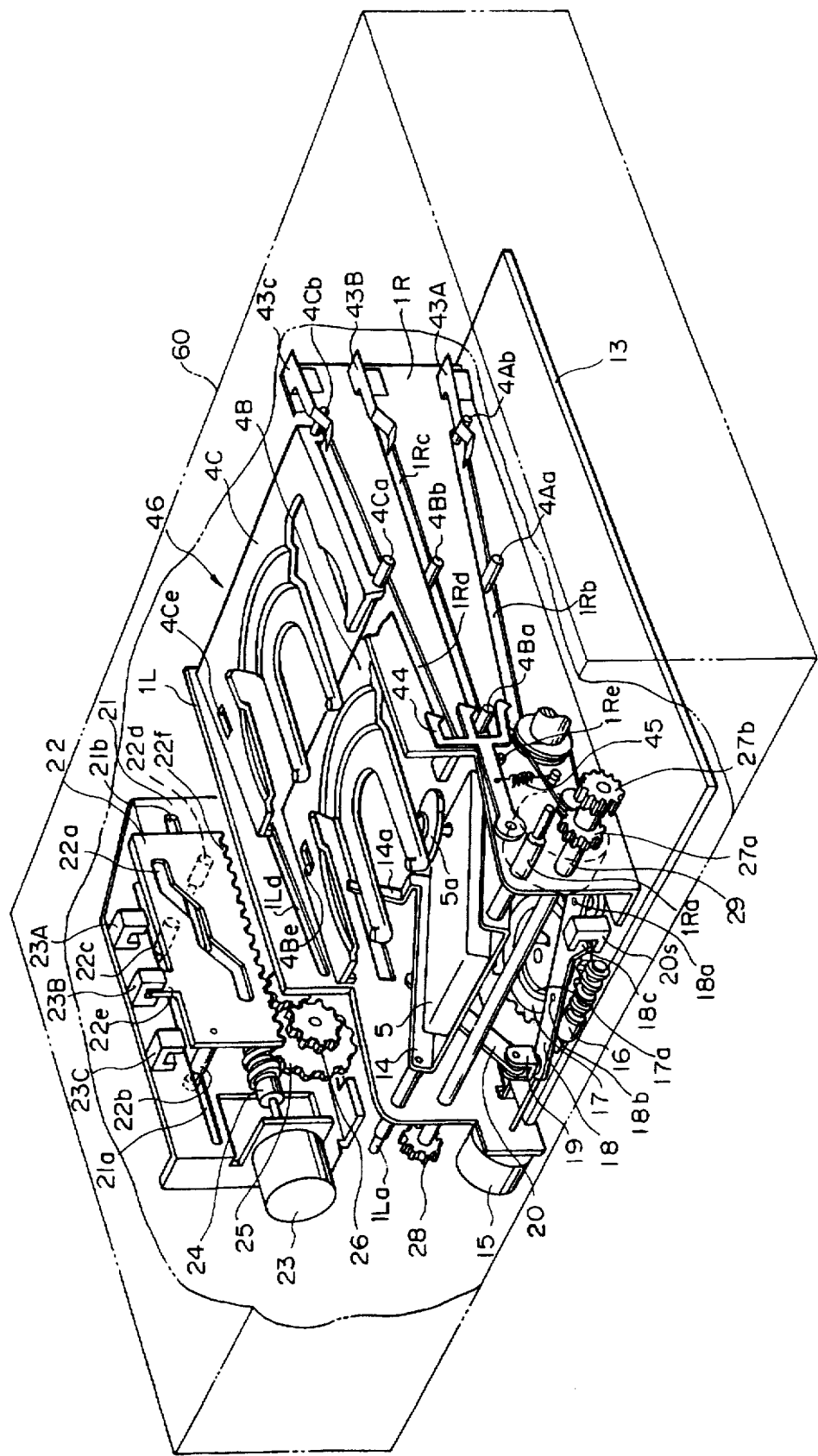
FIG. 3 is an exploded perspective view, showing principally a sub-chassis angular movement (pivotal) mechanism and a disk-drive-unit elevation mechanism, of the disk reproducing apparatus in FIG. 1.

In FIG. 2, reference numeral 2 denotes a drawer, numeral 3 denotes a main tray of the drawer 2, numeral 46 denotes a disk top and 7 is a sub-chassis. In FIG. 3, reference numeral 60 denotes a casing, i.e. outer frame or outer casing or housing, of the disk reproducing apparatus.

Inclined grooves 2a and 2b in the drawer 2, which descend toward this side as shown in the drawing, and two similar inclined grooves (not shown) slidably support projections 3a, 3b, 3c and 3d at four locations, on the main tray 3 having a disk mount (portion) 3k, whereby the drawer 2 supports the main tray 3 movably in parallel or translatable to a direction of the inclined grooves. In this connection, on the side of the projections 3a and 3b, a coil spring 11 biases the main tray 3 toward a projection 21 which is provided on the drawer 2. Further, since, on the side of the projections 3c and 3d, a coil spring (not shown) similarly biases the main tray 3, the main tray 3 is retained at an upper end of the inclined grooves.

An elongated groove 7c in the sub-chassis 7 slidably supports two projections 2g and 2h on the drawer 2 and, similarly, an elongated groove 7d in the sub-chassis 7 slidably supports two projections (not shown) on a remote side of the drawer 2, whereby the sub-chassis 7 slidably supports the drawer 2 in the extending direction of the elongated grooves. Moreover, the drawer 2 has a lower surface which has rack portions 2e and 2f integrally therewith. Pinions 12R and 12L which are in mesh respectively with the racks are rotatable on the outside of side chassis 1R and 1L, around shafts 1Ra and 1La set respectively on the side chassis 1R and 1L shown in FIG. 3. In this connection, the shaft 1Ra is inserted into and passes through a hole 7a in the sub-chassis 7. Similarly, the shaft 1La is inserted into and passes through a hole (not shown) in the sub-chassis 7. Thus, the shafts 1Ra and 1La form a pivotal or angular movement shaft of the sub-chassis 7.

A clamp holder 8 is supported on an upper part of the sub-chassis 7 for angular or pivotal movement around fulcrums 7f and 7g. A pin 8a which is set on the clamp holder 8 abuts against the upper surface of the drawer 2 due to weights of the clamp holder 8 and a disk damper 9. The arrangement is such that, when the drawer 2 is slidingly moved with respect to the sub-chassis 7 until the pin 8a falls into a recess 2j in the upper surface of the drawer 2, the clamp holder 8 is pivotally or angularly moved according to a profile of the recess 2j, and the disk damper 9 supported by the clamp holder 8 also descends.

In FIG. 3, reference symbols 1R and 1L denote the side chassis, 4B and 4C denote stock trays, reference numeral 5 denotes a disk drive unit, 13 denotes a main chassis, 14 is a pickup chassis, 21 is a step cam holder, and 22 is a step cam.

The side chassis 1R and 1L are fixed onto the main chassis 13 in parallel with each other so as to stand upright to the main chassis 13.

The three stock trays 4A, 4B and 4C on, of the disk stock (portion) 46 which the disks are mounted so as to be stored in the apparatus have the same form or shape. In FIG. 3, however, the stock tray 4A is not shown. The stock tray 4C will be described as a representation of the similar stock trays.

The stock tray 4C has two projections 4Ca and 4Cb on the side of the side chassis 1R. The two projections 4Ca and 4Cb are slidably supported in an elongated groove 1Rd formed in the side chassis 1R. Similarly, the stock tray 4C has two projections (not shown) on the side of the side chassis 1L. These two projections are slidably supported in an elongated groove 1Ld formed in the side chassis 1L. By such support structure, the stock tray 4C is movable in a direction of the elongated grooves 1Rd and 1Ld with respect to the side chassis 1R and 1L. This also applied to the other two stock trays 4A and 4B.

In connection with the above, three pairs of elongated grooves which are located respectively at upper, middle and lower positions are not in parallel to the other. As seen from FIG. 3, distances thereamong are short at hand or at this side, and are long at the renote or interior side thereof. Accurately, elongated grooves 1Rc and 1Rd are provided at positions where an elongated groove 1Rb is rotational displaced by an equal angle around the shaft 1Ra on the side chassis 1R. This also applied to the rotational displacement around the shaft 1La on the side chassis 1L.

Three leaf springs 43A, 43B and 43C are fixed to the side chassis 1R. The arrangement is such that the leaf springs 43A, 43b and 43C capture or seize the projections 4Ab, 4Bb and 4Cb on the respective stock trays 4A, 4B and 4C, whereby the leaf springs 43A, 43B and 43C can hold or retain the stock trays 4A, 4B and 4C at rearward ends (interior ends) of respective movable ranges (in FIG. 3, the projections 4Ab and 4Cb of the respective stock trays 4A and 4C are retained respectively by the leaf springs 43A and 43C).

In connection with the above, when a disk loading mechanism to be described later forcibly moves the stock trays 4A, 4B and 4C, the leaf springs 43A, 43B and 43C are resiliently or elastically flexed to release the stock trays 4A, 4B and 4C. Reversely, in a case where the disk loading mechanism moves the stock trays 4A, 4B and 4C from this side to a remote or rearward end thereof, the left springs 43A, 43B and 43C are resiliently flexed so as to capture or seize the stock trays 4A, 4B and 4C.

Further, three series of hooks 44 are provided on the side chassis 1R for pivotal movement within the range of a limit of a projection 1Re while being biased by a coil spring 45. The hooks 44 capture projections 4Aa, 4Ba and 4Ca on the stock trays 4A, 4B and 4C, to retain the stock trays 4A, 4B and 4C at forward movable ends thereof (in FIG. 3, the projection 4Ba on the stock tray 4B is captured by an intermediate one of the three series of hooks 44.).

In connection with the above, when the disk loading mechanism to be described later forcibly moves the stock trays 4A, 4B and 4C, the coil spring 45 resiliently is expanded to release the stock trays 4A, 4B and 4C. Reversely, in a case where the disk loading mechanism moves the stock trays 4A, 4B and 4C from the remote or rearward movable end to this side, the coil spring 45 resiliently is expanded to capture the stock trays 4A, 4B and 4C.

The aforesaid shafts 1Ra and 1La respectively on the side chassis 1R and 1L and extending respectively through the side chassis 1R and 1L are coaxial with each other. The disk drive unit 5 is fixed to a pickup chassis 14 which is supported for pivotal movement by the shafts 1Ra and 1La, on the inside of the side chassis 1R and 1L. The disk drive unit 5 has a turntable 5a on which the disk is mounted and is rotated. In this case, the disk reproducing means is constituted by the turntable 5a and a pickup or a head (not shown) and a movement mechanism therefor.

A pickup elevation mechanism having the following structure is provided below the pickup chassis 14 and on the main chassis 13. A worm wheel 17 is rotated by a drive force of a motor 15 through a worm 16. A cam groove 17a is provided in the worm wheel 17, to receive a projection 18b on an arm 18. The arm 18 has one end pivotally retained on the main chassis 13 through a fulcrum 18a. Thus, the arm 18 is pivotally or angularly moved following the cam groove 17a in accordance with rotation of the worm wheel 17. A rod 20 is provided on the other end of the arm 18 for pivotal or angular movement through a hinge 19. The other end of the rod 20 is connected for angular movement to the pickup chassis 14. Accordingly, when the arm 18 is moved angularly, the pickup chassis 14 is moved angularly around the shafts 1Ra and 1La serving as fulcrums to be elevated.

The shafts 1Ra and 1La form the angular movement fulcrum of the sub-chassis 7 at opposite outsides of the side chassis 1R and 1L. As has been described before, the shafts 1Ra and 1La also serve as the shaft for the pinions 12R and 12L. Now, a sub-chassis angular movement mechanism which limits the angular movement of the sub-chassis 7 and which selectively decides three postures will be described with reference to FIG. 3.

The step cam holder 21 is fixed onto the main chassis 13 at the outside of the side chassis 1L in parallel thereto. The step cam holder 21 has two horizontally elongated linear grooves 21a and 21b. The elongated groove 21a supports slidably projections 22b and 22c, at two locations, of the step cam 22. The elongated groove 21b slidably supports a projection 22d on the step cam 22. Thus, the step cam 22 is so arranged as to be movable in parallel and horizontally to the step cam holder 21.

The step cam 22 has a cam groove 22a. The cam groove 22a has three horizontal regions which are different in height from each other, and two inclined regions which connect them to each other smoothly. A projection 7h (FIG. 2) on the sub-chassis 7 is guided by the cam groove 22a, whereby the sub-chassis 7 is moved angularly according to motion of the step cam 22. When the projection 7h is located at any one of the three horizontal regions of the cam groove 22a, the sub-chassis 7 can stably take a predetermined one of three inclined postures.

The step cam 22 has, at a lower end thereof, a horizontal rack 22f. A drive force of a motor 23 mounted to the step cam holder 21 is transmitted to the rack 22f through a worm 24, a worm wheel 25 and a pinion 26. Thus, the step cam 22 is moved.

A shutter 22e on an upper end of the step cam 22 successively shields optical axes of three photo-sensors 23A, 23B and 23C fixed to the step cam holder 21, according to the motion of the step cam 22. Positions of the three photo-sensors 23A, 23B and 23C are set such that the optical axes are shielded by the shutter 22e when the projection 7h on the sub-chassis 7 is in the three horizontal regions on the cam groove 22a. Accordingly, depending upon the fact as to which of the three photo-sensors is shielded, three inclined postures of the sub-chassis 7 are judged or determined.

Then, the disk loading mechanism will be described referring to FIG. 4.

A drive force of a motor 30 mounted on an inside of the side chassis 1R is transmitted, while being decelerated, to a pulley 33a pivotally supported on the outside of the side chassis 1R, through a pulley 31 fixed to the motor shaft and through a belt 32. The drive force is further transmitted, while being further decelerated, from a gear 33b integral with the pulley 33a, to a gear 34a on a gear holder 42, and a gear 34b integral therewith. The gear 34b is in mesh simultaneously with a cam gear 35 and a cam gear 36 which are pivotally supported by the gear holder 42. In this connection, the gear holder 42 is fixed to the main chassis 13 in parallel to the side chassis 1R.

A drive force of the cam gear 35 is transmitted, in increase in speed, to a gear 27b which projects from the side chassis 1R, through a smaller cam gear 37 pivotally supported by the gear holder 42. The drive force is further transmitted to the pinion 12R (FIG. 2) which shares a shaft the fulcrum of the sub-chassis 7, from a gear 27a integral with the gear 27b, to drive the rack 2e of the drawer 2. In this connection, the gears 27b and 27a are integrally connected to a gear 28 (FIG. 3) on the outside of the side chassis 1L, by a synchronous shaft 29. Since the gear 28 drives the rack 2f of the drawer 2, through the pinion 12L (FIG. 2) which shares the shaft with fulcrum of the sub-chassis 7, the left- and right-hand amounts of movement of the drawer 2 become exactly equal to each other.

On one hand, a drive force of the cam gear 36 is transmitted, in increase in speed, to a smaller cam gear 38 and a gear 39 pivotally supported by the gear holder 42. Projections 40b and 40c are guided by an elongated groove 42a in the gear holder 42. Thus, a rack 40 slidable in parallel to the side chassis 1R is driven. The rack 40 has integrally a longitudinal rib 40a perpendicular to the side chassis 1R.

As seen in FIG. 2, the sub-chassis 7 supports a slider 10 by an elongated groove 7e therein in a slidable manner in the direction of the elongated groove 7e. The slider 10 has two projections 10a and 10b on the outside thereof. The projections 10a and 10b receive therebetween the longitudinal rib 40a on the rack 40, whereby the slider 10 is moved in accordance with movement of the rack 40 and according to the inclined posture of the sub-chassis 7. The slider 10 has two projections 10c and 10d in the form of a small rib on the inside of the sub-chassis 7. The slider 10 interacts with the stock trays as follows.

First, assume a case where the slider 10 is positioned at the interior end of the elongated groove 7e in the sub-chassis 7 and where the three stock trays 4A, 4B and 4C are positioned at the interior ends of the elongated grooves 1Rb, 1Rc and 1Rd in the side chassis 1R. When the sub-chassis 7 is moved angularly, i.e. pivoted, so as to change the inclined angle, the projection 10c, of the two projections 10c and 10d on the slider 10, passes through this or outer (forward) side of the projections 4Aa, 4Ba and 4Ca on the three respective stock trays and, simultaneously, the projection 10d passes through the rear side thereof. When the inclined angle of the sub-chassis 7 is equal to the inclined angle of one of the stock trays, the projection (4Aa or 4Ba or 4Ca) on the one stock tray is received between the two projections 10c and 10d on the slider 10.

Secondly, assume a case where the slider 10 is positioned at the front or forward end of the elongated groove 7e in the sub-chassis 7 and where any one of the three stock trays 4A, 4B and 4C is positioned at the forward ends of the elongated grooves 1Rb, 1Rc and 1Rd in the side chassis 1R. When the sub-chassis 7 is angularly moved to change the inclined angle thereof, the projection 10c of the two projections on the slider 10, passes through this (forward) side of the projection (4Aa or 4Ba or 4Ca) on the one stock tray located at the forward end thereof. Simultaneously, the projection 10d passes through the rear side thereof. When the inclined angle of the sub-chassis 7 is equal to that of the stock tray, the projection (4Aa or 4Ba or 4Ca) of the stock tray is received between the two projections 10c and 10d on the slider 10.

By the above-described relationship among the longitudinal rib 40a on the rack 40, the slider 10 and the projection 4Aa or 4Ba or 4Ca of the stock tray, when the inclined angle of the sub-chassis 7 is equal to that of one of the stock trays, the one stock tray is moved through the full stroke of the elongated grooves in the side chassis 1R and 1L according to the movement of the rack 40. Specifically, the stock tray is moved through the full stroke of the elongated grooves in the side chassis, by the drive force of the cam gear 36.

Subsequently, the relationship of the cam gear 35 and the smaller cam gear 37 which drive the drawer 2 with the cam gear 36 and the smaller cam gear 38 which drive the stock tray will be described.

First, the cam gear 35 and the cam gear 36 are always rotated, during a whole operation stroke from a state where the drawer 2 fully projects from the sub-chassis 7, to a state where the stock tray having been positioned at the forward ends of the side chassis 1R and 1L is stored into the rear end thereof, through a state where the drawer 2 fully enters the interior end of the sub-chassis 7. In addition, velocity ratios or speed ratios of the series of gears are set such that the full operation stroke is completed within one revolution of the cam gears 35, 36.

Further, the cam gear 35 has an outer peripheral cam shape or configuration 35b. A tooth width of the cam gear 35 is smaller within a specific angular range of a gear part 35a so that the outer peripheral cam shape 35b is not in mesh with a gear part 37a of the smaller cam gear 37. The smaller cam gear 37 has also an outer peripheral cam shape or configuration 37b. Thus, there is provided such meshed engagement relationship that the small cam gear 37 is not rotated when the cam gear 35 is rotated within a certain angular range.

Similarly, the cam gear 36 has an outer peripheral cam shape 36b, and a tooth width thereof is smaller within a specific angular range of a gear part 36a so that the outer peripheral cam shape 36b is not in mesh with a gear part 38a of the smaller cam gear 38. The smaller cam gear 38 has also an outer peripheral cam shape 38b. Thus, there is provided such meshed engagement relationship that the smaller cam gear 38 is not rotated when the cam gear 36 is rotated within a certain angular range.

With the arrangement as described above and by setting or adjusting appropriately timings of respective rotation and stoppage of the smaller cam gears 37 and 38, it is made possible that a period of time during which only the drawer 2 is moved, a period of time during which none of the drawer 2 and the stock trays is moved, and a period of time during which only the stock tray is moved occur successively. Further, under the above-mentioned condition that the cam gears 35 and 36 continue to be rotated through the whole period, a shutter 36c is provided on the cam gear 36, and three photo-sensors 41A, 41B and 41C are provided on the gear holder 42, whereby making it possible to judge or discriminate three states, i.e. a state in which the drawer 2 fully projects from the sub-chassis 7, a state in which the drawer 2 is fully inserted to be stored, while one stock tray is pushed out to the forward ends of the side chassis 1R and 1L so that both are not moved, and a state in which the stock tray is fully stored into the rearward end can be judged.

Disk delivering/receiving operation of the drawer 2 and the stock tray in the apparatus thus constructed will now be described with reference to FIGS. 5-12.

FIGS. 5-8 show a case where the disk has a standard diameter.

Figure 5:
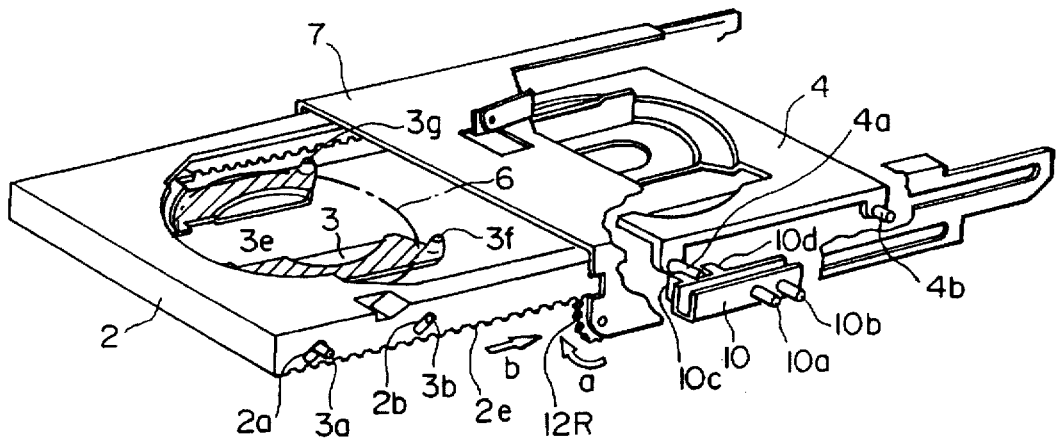
FIG. 5 is an explanatory perspective view showing delivering receiving operation, of a disk having a standard diameter, by a main tray and a stock tray in the disk reproducing apparatus in FIG. 1.

FIG. 5 is a state in which, when the drawer 2 is drawn out to a first position, i.e. the outermost position, a user or operator mounts a disk 6 on the apparatus, the pinion 12R is thereafter rotated in a direction of an arrow a, and the rack 2e, that is, the drawer 2 is driven in a direction of an arrow b. The main tray 3 is positioned at the upper ends of the inclined grooves 2a and 2b in the drawer 2 by the biasing of the coil spring 11 (FIG. 2). Moreover, the sub-chassis 7 is forced to change the inclined angle thereof to be equal to the inclined angle of one stock tray 4 (one of the stock trays 4A, 4B and 4C (FIG. 3)) defined by the forward ends of the longitudinal grooves 1Rb, 1Rc and 1Rd (FIG. 3) in the side chassis 1R, whereby the projections 10c and 10d in the form of a small rib on the slider 10 supported by the sub-chassis 7 receive therebetween the projection 4Aa on the stock tray 4. At this time, the disk 6 indicated by a one-dot-and-chain line is positioned by an arcuate or circular step 3e and projections 3f and 3g on the main tray 3. In this connection, a part of the main tray 3 to which hatching is applied is a disk mounting surface.

Figure 6:
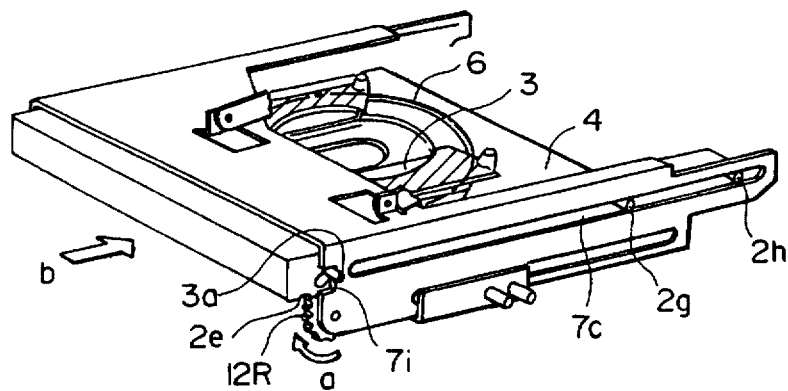
FIG. 6 is an explanatory perspective view showing delivering receiving operation of the disk having the standard diameter, by the main tray and the stock tray in the disk reproducing apparatus in FIG. 1.

FIG. 6 shows a state in which the drawer 2 is transferred in the direction indicated by the arrow b, and the projection 3a on the main tray 3 abuts against the interior of a cut-out 7i in the sub-chassis 7, while the projection 2h on the drawer 2 does not reach the interior end of the elongated groove 7c in the sub-chassis 7. In this case, the main tray 3 is captured by the slider 10 and is in parallel to one stock tray 4 positioned at the forward end of the elongated groove in the side chassis 1R. The disk mounting surface of the main tray 3 is situated at a position higher than the stock tray 4. Accordingly, in movement of the main tray 3 which reaches this position, the disk 6 does not interfere with the stock tray 4. It should be noted that, the main tray 3 and the stock tray 4 are not overlapped each other in form or shape in the axial direction of the disk 6 at this time.

Figure 7:
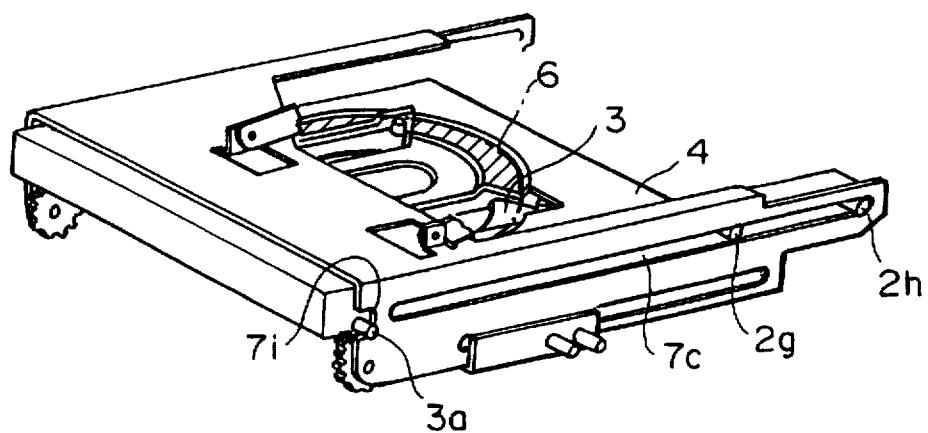
FIG. 7 is an explanatory perspective view showing delivering/receiving operation, of the disk having the standard diameter, by the main tray and the stock tray in the disk reproducing apparatus in FIG. 1.

FIG. 7 shows a state that the drawer 2 is further transferred in the direction of the arrow b, and reaches a second position. More specifically, the projection 2h on the drawer 2 reaches the interior end of the elongated groove 7c in the sub-chassis 7, and the projection 3a on the main tray 3 just reaches the lower end of the inclined groove 2a in accordance with the inclined groove 2a in the drawer 2, while abutting against the interior part of the cut-out 7i in the sub-chassis 7. At this time, the main tray 3 descends axially of the disk as compared with the case in FIG. 6. Since the disk mounting surface of the main tray 3 becomes lower than the disk mounting surface of the stock tray 4 (in FIG. 7, a part to which hatching is applied), the disk 6 is transferred to mounted on the stock tray 4.

Figure 8:
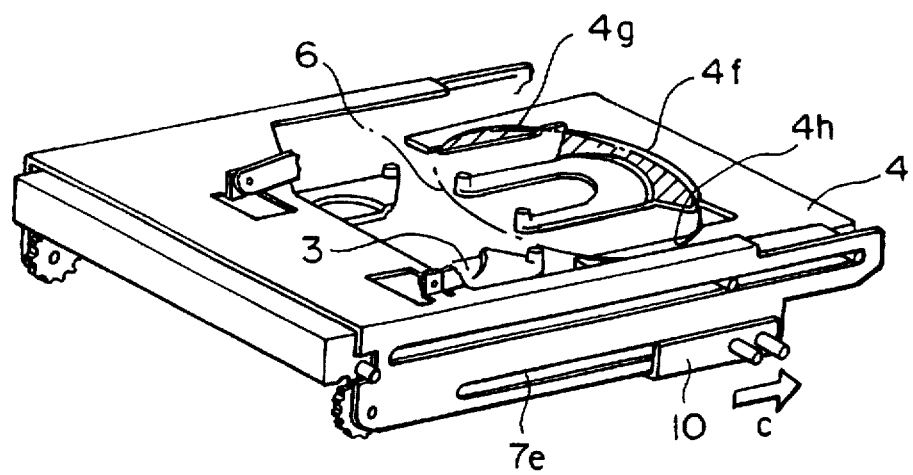
FIG. 8 is an explanatory perspective view showing delivering/receiving operation, of the disk having the standard diameter, by the main tray and the stock tray in the disk reproducing apparatus in FIG. 1.

FIG. 8 shows a case where the slider 10 is driven in a direction of an arrow c, whereby the stock tray 4 is just transferred to the interior end of the elongated groove in the side chassis 1R. The disk 6 is mounted on the stock tray 4, and is positioned by arcuate steps 4f, 4g and 4h on the stock tray 4.

In this way, the stroke from mounting to storing of the disk of the standard diameter is completed.

FIGS. 9–12 show a case where the smaller diameter disk is used. Essentially there is no difference in operations of the apparatus between the small-diameter disk and the standard-diameter disk except in the disk mounting surface.

Figure 9:
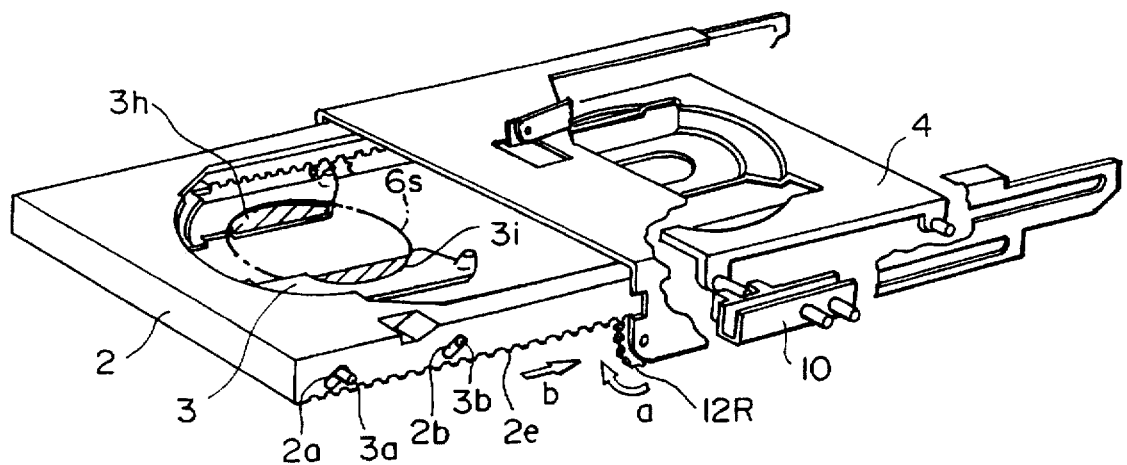
FIG. 9 is an explanatory perspective view showing delivering/receiving operation, of the disk having a small diameter, by the main tray and the stock tray in the disk reproducing apparatus in FIG. 1.

FIG. 9 shows a state in which the pinion 12R is rotated in the direction of the arrow a, and the rack 2e or the drawer 2 is driven in the direction of the arrow b after the user have mounted the disk on the drawer at the first position. At this time, a disk 6s having a small diameter is positioned by arcuate steps 3h and 3i on the main tray. In this connection, a part of the main tray 3 to which hatching is applied becomes the disk mounting surface.

Figure 10:
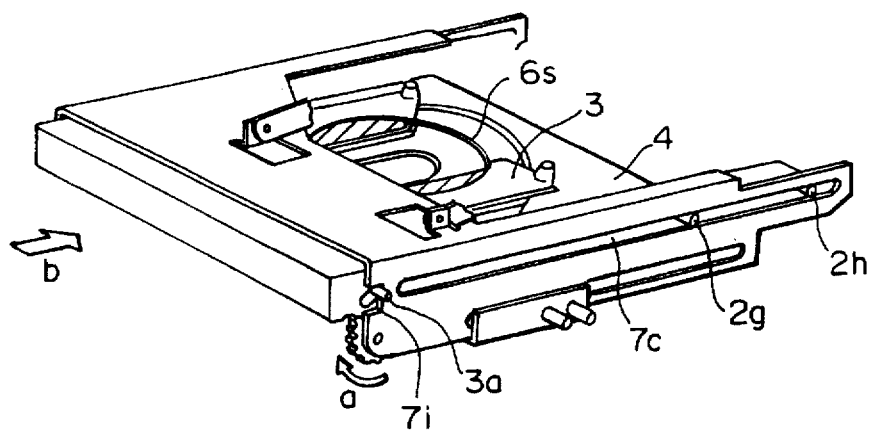
FIG. 10 is an explanatory perspective view showing delivering/receiving operation, of the disk having the small diameter, by the main tray and the stock tray in the disk reproducing apparatus in FIG. 1.

FIG. 10 shows that the drawer 2 is transferred in the direction of the arrow b, and the projection 3a on the main tray 3 has just abutted against the interior of the cutout 7i in the sub-chassis 7. At this time, the disk mounting surface of the main tray 3 is situated at a level or position higher than projections 4i and 4j to be described later (FIG. 12) on the stock tray 4. Accordingly, in the movement of the main tray 3 reaching this position, the disk 6s does not interfere with the stock tray 4.

Figure 11:
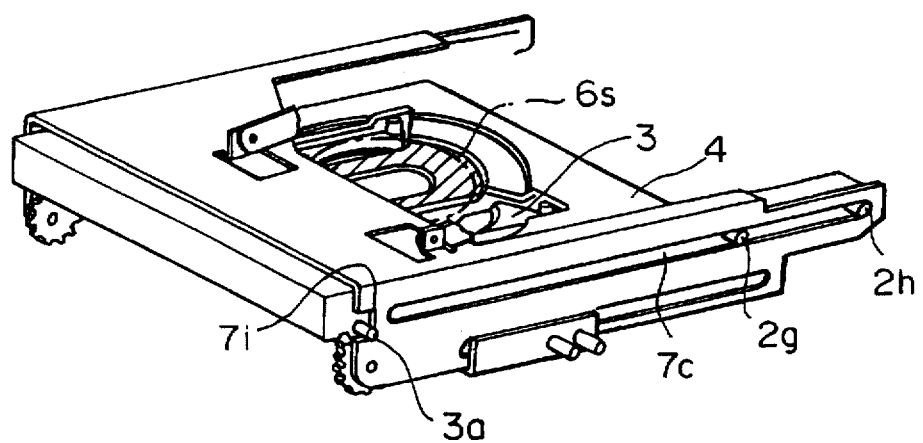
FIG. 11 is an explanatory perspective view showing delivering/receiving operation, of the disk having the small diameter, by the main tray and the stock tray in the disk reproducing apparatus in FIG. 1.

FIG. 11 shows that the drawer 2 is further transferred to the second position in the direction of the arrow b, and the projection 3a on the main tray 3 just reaches the lower end of the inclined groove 2a in accordance with the inclined groove 2a in the drawer 2 while abutting against the interior part of the cut-out 7i in the sub-chassis 7. The main tray 3 descends in the axial direction of the disk, as compared with the case in FIG. 10. Since the disk mounting surface of the main tray 3 becomes lower than the disk mounting surface of the stock tray 4 (in FIG. 11, a part to which hatching is applied), the disk 6s is transferred to or mounted on the stock tray 4.

Figure 12:
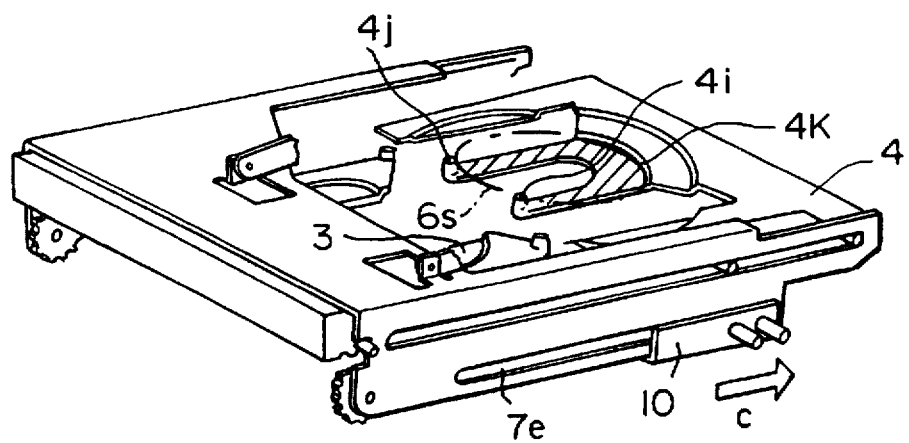
FIG. 12 is an explanatory perspective view showing delivering receiving operation, of the disk having the small diameter, by the main tray and the stock tray in the disk reproducing apparatus in FIG. 1.

FIG. 12 shows the state that the slider 10 is driven in the direction of the arrow c, whereby the stock tray 4 is just transferred to the interior end of the elongated groove in the side chassis 1R. The disk 6s is mounted or disposed on the stock tray 4, and is defined in position by an arcuate step 4k and the projections 4i and 4j on the stock tray 4.

In this way, the stroke from mounting to storing of the disk of the small diameter is completed.

Now, the whole operation of the apparatus according to this embodiment, that is, mounting, storing, the reproduction, change and ejection or taking-out of the disk will be described referring to FIGS. 13–22.

Figure 13:
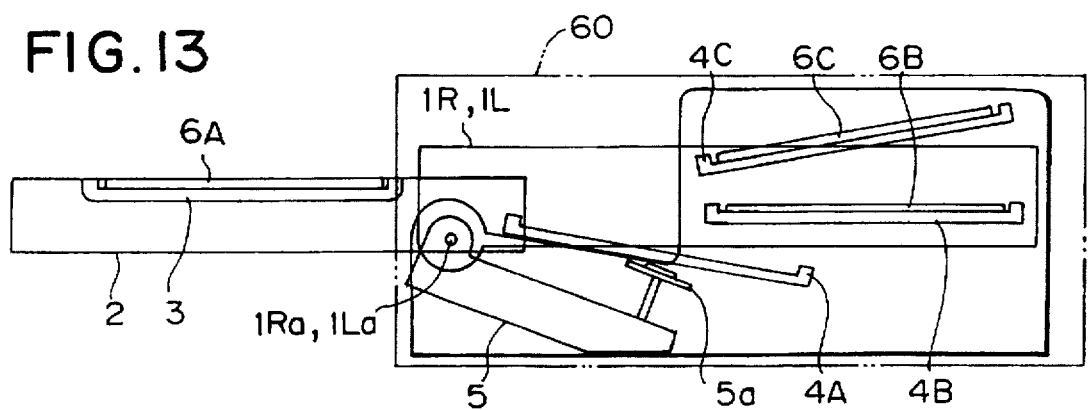
FIG. 13 is an explanatory side view showing disk treating operation in the disk reproducing apparatus in FIG. 1.

FIG. 13 shows that the user has just disposed or mounted a disk 6A on the main tray 3 when the drawer 2 projects fully or is drawn out fully from the side chassis 1R (or 1L) to the first position situated outside of the casing 60.

In this state in which the drawer 2 projects, at least one of the three stock trays does not have the disk mounted thereon. One of the stock trays which does not have the disk thereon protrudes out toward the drawer 2. In FIG. 13, the stock tray 4B has thereon a disk 6B, and the stock tray 4C has thereon a disk 6C and is located at the interior of the apparatus. Specifically, the disk 6B and the disk 6C are stocked, while the stock tray 4A does not have thereon the disk and protrudes out toward the drawer 2. A control circuit (not shown) stores information that the stock tray 4A is under a waiting state.

In the present embodiment, at this time, the middle or central horizontal region of the three horizontal regions of the cam groove 22a in the step cam 22 (FIG. 3) supports the projection 7h of the sub-chassis 7, and the photo-sensor 23B is screened by the shutter 22e.

Further, at this time, the disk drive unit 5 is under a state in which it descends downwardly around the shafts 1Ra and 1La serving as pivots or fulcrums. The turntable 5a is located lower than the disk mounting surface of the stock tray 4A.

Figure 4:
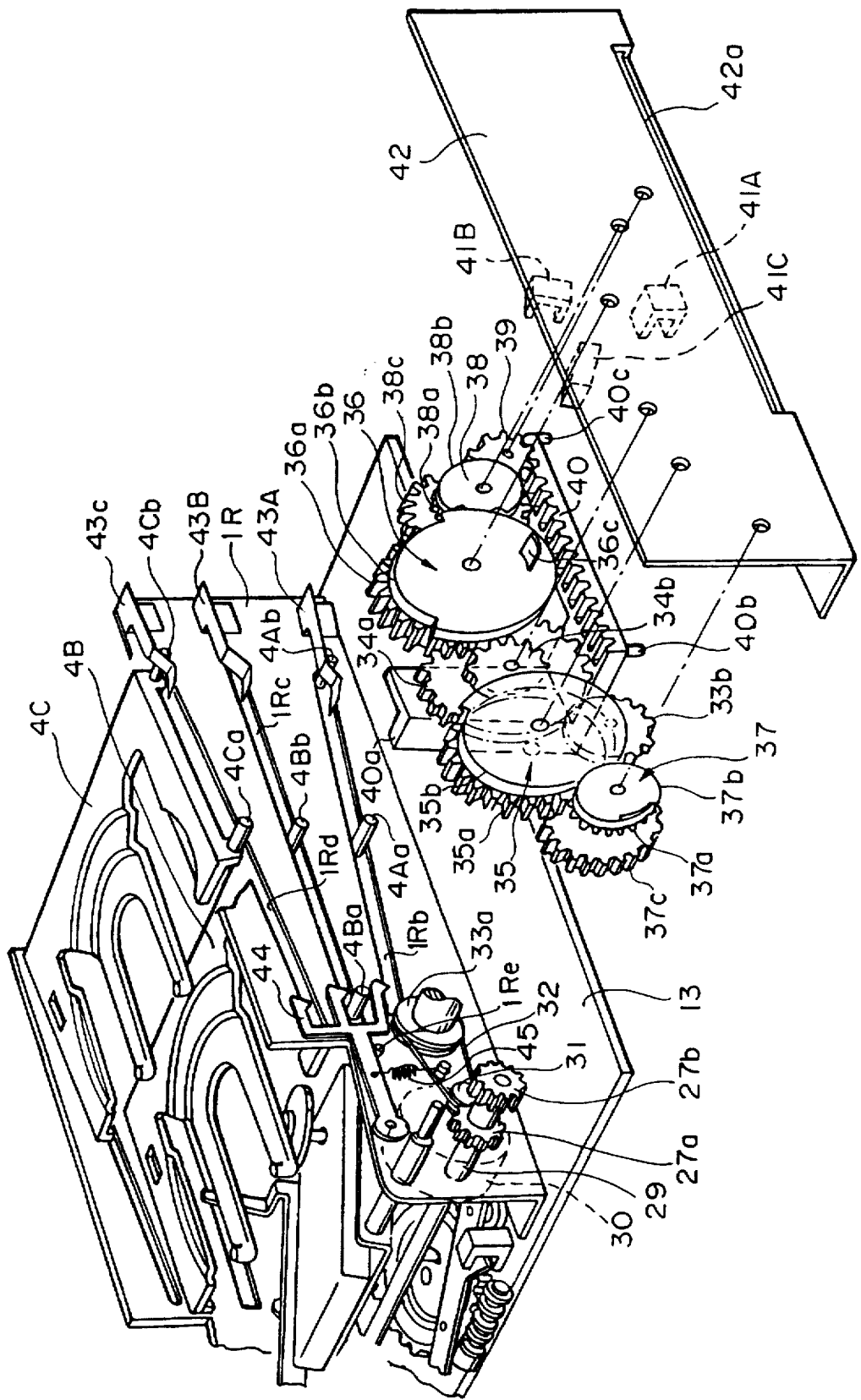
FIG. 4 is an exploded perspective view, showing principally a disk loading mechanism of the disk reproducing apparatus in FIG. 1.

The photo-sensor 41A among the three photo-sensors 41A, 41B and 41C shown in FIG. 4 is screened by the shutter 36c. A control circuit (not shown) detects that the drawer 2 is under a projecting state.

When the user pushes the drawer 2 in the direction of the arrow b (FIG. 14), the cam gear 35 shown in FIG. 4 is rotated in the counterclockwise direction through the series of gear trains. The shutter 36c is moved so that screening of the photo-sensor 41A is released. The control circuit (not shown) activates the motor 30 shows in FIG. 4. The drawer 2 is driven in the direction f the arrow b (FIG. 14).

Figure 14:
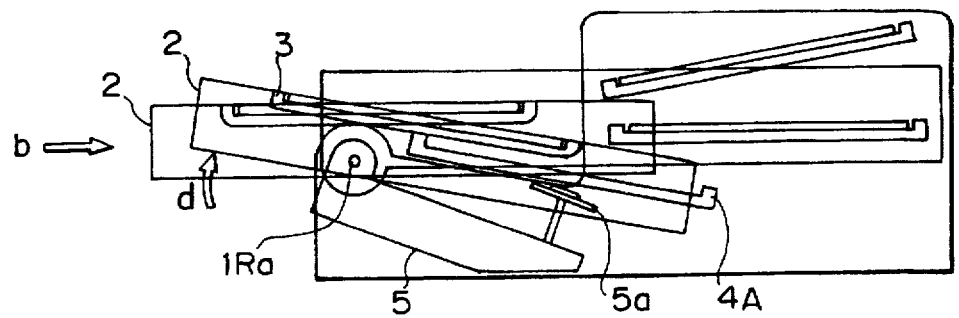
FIG. 14 is an explanatory side view showing disk treating operation in the disk reproducing apparatus in FIG. 1.

As shown in FIG. 14, the drawer 2 is moved in the direction of the arrow b and reaches the second position. In the second position, the drawer 2 is inclined as an arrow d. As shown in FIG. 3, this inclination operation is produced by the step cam 22 driven by the motor 23 to change the posture of the sub-chassis 7. Since the control circuit (not shown) stores therein information that the stock tray 4a stands waiting the control circuit controls the step cam 22 to move to a state in which the inclined angle of the sub-chassis 7 is equal to that of the stock tray 4A, that is, a state in which the lower-most horizontal region among three horizontal regions of the cam groove 22a in the step cam 22 supports the sub-chassis 7, in other words, a state in which the photo-sensor 23A is screened by the shutter 22e.

Figure 15:
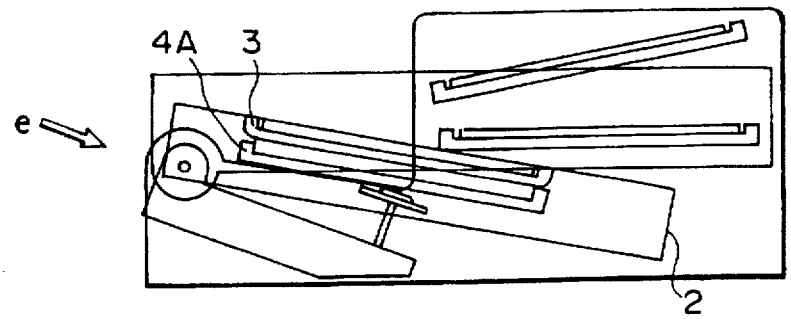
FIG. 15 is an explanatory side view showing disk treating operation in the disk reproducing apparatus in FIG. 1.

FIG. 15 shows a state in which the drawer 2 having been thus inclined is further driven in the direction of an arrow e, so that the main tray 3 is overlapped over the stock tray 4A. This corresponds to the state in FIG. 6 or FIG. 10.

Figure 16:
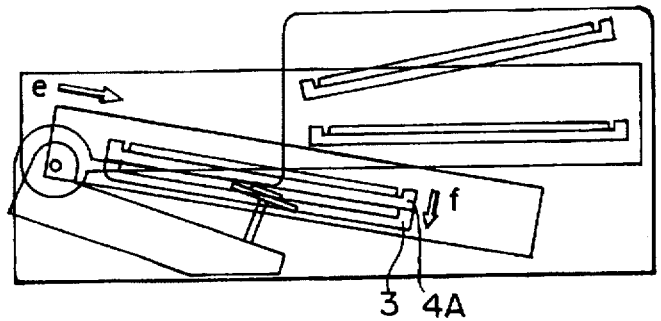
FIG. 16 is an explanatory side view showing disk treating operation in the disk reproducing apparatus in FIG. 1.

FIG. 16 shows a state in which the main tray 3 has descended below the stock tray 4A by the further driving of the drawer 2 in the direction of the arrow e. This corresponds to a state in FIG. 7 or FIG. 11. The disk 6A is transferred to and mounted on the stock tray 4A.

At this time, the clamp holder 8 shown in FIG. 2 descends according to the movement of the drawer 2 in the direction f the arrow e. Thus, the disk clamper 9 approaches the disk 6A.

In the above-described steps of FIGS. 13 to 16, the smaller cam gear 37 shown in FIG. 4 is continuously rotated while keeping in meshed engagement at the gear part thereof with the cam gear 35. On the other hand, since the smaller cam gear 38 faces the narrow tooth width region of the cam gear 36, the gear part thereof is not in mesh therewith. Since the outer peripheral cam 36b of the cam gear 36 and the outer peripheral cam 38b of the smaller cam bear 38 prevent rotation of the smaller cam gear 38, the smaller cam gear 38 is not rotated at all.

In FIG. 16, when the main tray 3 has completed to descend below the stock tray 4A, that is, as shown in FIG. 7, when the projection 2h on the drawer 2 reaches the interior end of the elongated groove 7c in the sub-chassis 7, the narrow tooth width range of the cam gear 35 reaches the smaller cam gear 37. Simultaneously, the outer peripheral cam 35b of the cam gear 35 and the outer peripheral cam 37b of the smaller cam gear 37 come to prevent rotation of the smaller cam gear 37, so that the small cam gear 37 is not rotated thereafter. Meanwhile, the smaller cam gear 38 still faces the narrow tooth width range of the cam gear 36, and the outer peripheral cam 36b of the cam gear 36 and the outer peripheral cam 38b of the smaller cam gear 38 still prevent rotation of the small cam gear 38. Accordingly, the smaller cam gear 38 is not rotated. Thus, a state is produced in which both of the smaller cam gears 37 and 38 are not rotated. In this state, the shutter 36c shown in FIG. 4 screens the photo-sensor 41B, and the control circuit (not shown) recognizes that the disk is set in a reproducible position.

In a case where the user or operator has given an instruction to the apparatus to reproduce the disk 6A before the step of FIG. 16 is completed, the control circuit (not shown) stops driving the motor 30, and controls to raise the disk drive unit 5 for reproduction of the disk 6A.

Figure 17:
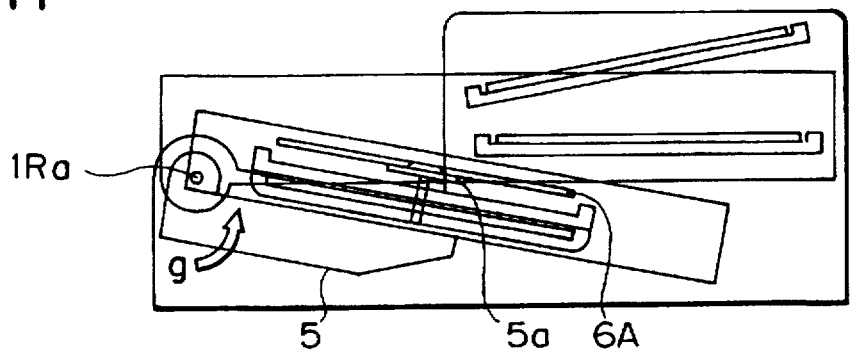
FIG. 17 is an explanatory side view showing disk treating operation in the disk reproducing apparatus in FIG. 1.

FIG. 17 shows that the disk drive unit 5 ascends as described above, and the turntable 5a carries the disk 6A to raise the same from the stock tray 4A. At this time, the disk 6A is held stably between the disk damper 9 (FIG. 2) and the turntable 5a.

In this way, the disk drive unit 5 is capable of being inclined to inclined postures equal to a plural kinds of inclined postures to be taken by the drawer 2. The disk located in the second position is reproduced while being inclined.

Figure 17A:
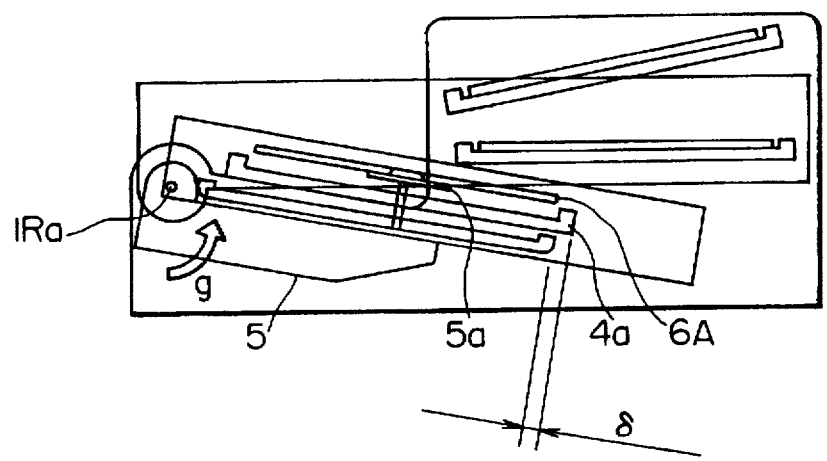
FIG. 17A shows a modification of the apparatus of FIG. 1 in a state corresponding to FIG. 17.

In connection with the above, the arrangement may be such that, after the disk 6 has been delivered or transferred to the stock tray 4A from the main tray 3 as shown in FIG. 16, the stock tray 4A may be, for example, further moved to the interior by a desired distance or length, so that the disk can be reproduced at the further moved position while being clamped between the turntable 5a and the damper 9. This is made possible by, for example, having a distance or length from a center of pivot 1Ra of the disk drive unit 5 to a center of the turntable 5a longer than that (the case) shown in FIG. 17. In a case where the length of the disk drive unit 5 from its pivot center 1Ra to the center of the turntable 5a is longer, for example as shown in FIG. 17A, after the disk 6 has been transferred from the main tray 3 to the stock tray 4A, the stock tray 4A is displaced or moved by a desired length δ and the disk drive unit 5 is pivotally displaced around the axis 1Ra to receive the disk 6 on the turntable for reproduction of the disk.

Ascending or rising operation of the disk drive unit 5 is executed by the pivotal motion of the pickup chassis 14 driven by the motor 15 as has been described in FIG. 3. If the pickup chassis 14 is pivoted to ascend, a projection 14a on the pickup chassis 14 passes through the hole in the stock tray (hole 4Be or 4Ce in case of the stock tray 4B or 4C (FIG. 3), while a hole in the stock tray 4A is not shown) to abut against a ceiling face of the sub-chassis 7. An abrupt increase of a load on the motor 15 generated by this abutment is detected electrically, and the control circuit (not shown) stops driving the motor 15.

Figure 18:
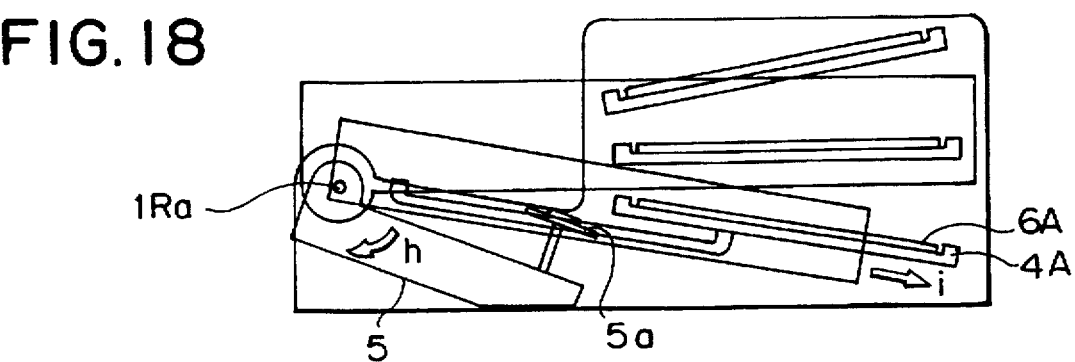
FIG. 18 is an explanatory side view showing disk treating operation in the disk reproducing apparatus in FIG. 1.

FIG. 18 shows a state in which the user's or operator's instruction to stop the reproduction of the disk 6A causes the disk drive unit 5 to descend and, further, causes the stock tray 4A with the disk 6A thereon to be moved to the interior end of the longitudinal groove 1Rb in the side chassis 1R, that is, a state in which storing of the disk 6A has been completed.

Herein, the disk drive unit 5 is lowered by the rotation of the motor 15 in a direction reverse to that upon ascending, while a control circuit (not shown) detects indirectly the completion of the descending or lowering operation to stop the motor 15 by detecting the screening of the photo-sensor 20S by means of a shutter 18c on the arm 18 shown in FIG. 3.

Furthermore, driving of the stock tray 4A is started in the following steps; the motor 30 drives the series of gear trains in FIG. 4 to rotate the cam gear 36 in the counterclockwise direction similarly to a manner till FIG. 16, the broad tooth width range of the cam gear comes to be in mesh with the smaller cam gear 36 comes to be in mesh with the smaller cam gear 38, and the outer peripheral cam 36b on the cam gear 36 becomes not to restrict or restrain the outer peripheral cam 38b on the smaller cam gear 38 so that the smaller cam gear 38 begins to be rotated. Further, the shutter 36c screens the photo-sensor 41C, whereby the control circuit (not shown) detects that disk storing has been completed, to stop the motor 30. During this period of time, the smaller cam gear 37 is not rotated.

Figure 19:
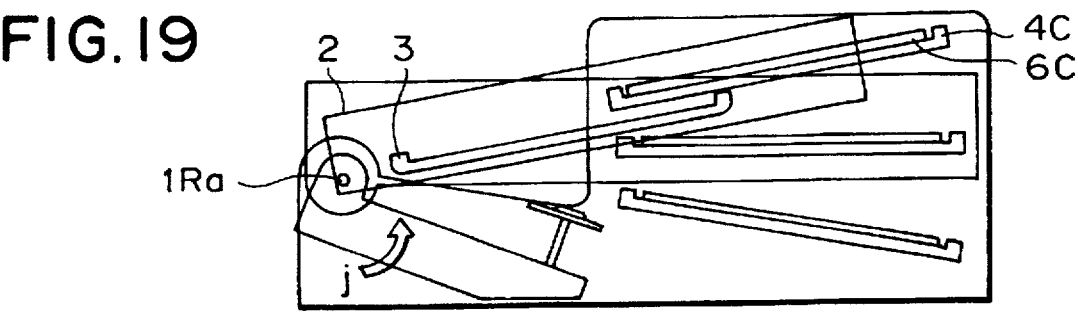
FIG. 19 is an explanatory side view showing disk treating operation in the disk reproducing apparatus in FIG. 1.
Figure 20:
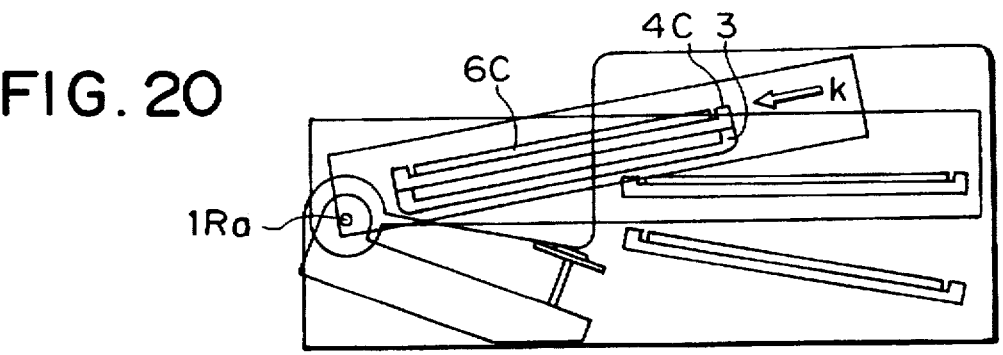
FIG. 20 is an explanatory side view showing disk treating operation in the disk reproducing apparatus in FIG. 1.
Figure 21:
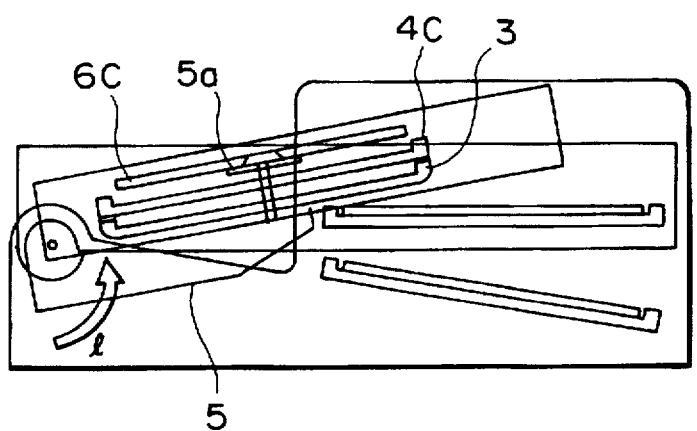
FIG. 21 is an explanatory side view showing disk treating operation in the disk reproducing apparatus in FIG. 1.

FIGS. 19–21 show an operation of the apparatus in a case where the user or operator instructs to reproduce the disk 6C stored in the stock tray 4C, that is, to perform disk change operation.

In FIG. 19, the control circuit (not shown) drives the step cam 22 of FIG. 3 in order to equalize the inclined angle of the sub-chassis 7 (FIG. 2 etc.) to the inclined angle of the stock tray 4C, so that the shutter 22e screens the photo-sensor 23C.

In FIG. 20, the control circuit (not shown) rotates the motor 30 of FIG. 4 in a direction reverse to that in FIGS. 13–16, and moves the stock tray 4C in the direction of an arrow k. Similarly to the case of FIG. 16, the control circuit (not shown) detects, due to the screening of the photo-sensor 41B, that both of the smaller cam gears 37 and 38 has come not to be rotated, and stops driving. At this time, the stock tray 4C is situated just over the main tray 3.

FIG. 21 shows a state where, similarly to that of FIG. 17, the disk drive unit 5 ascends, and the turntable 5a carries the disk 6C to raise the same from the stock tray 4C. Operations of the disk drive unit 5 to ascend and stop is the same as described in FIG. 17.

Figure 22:
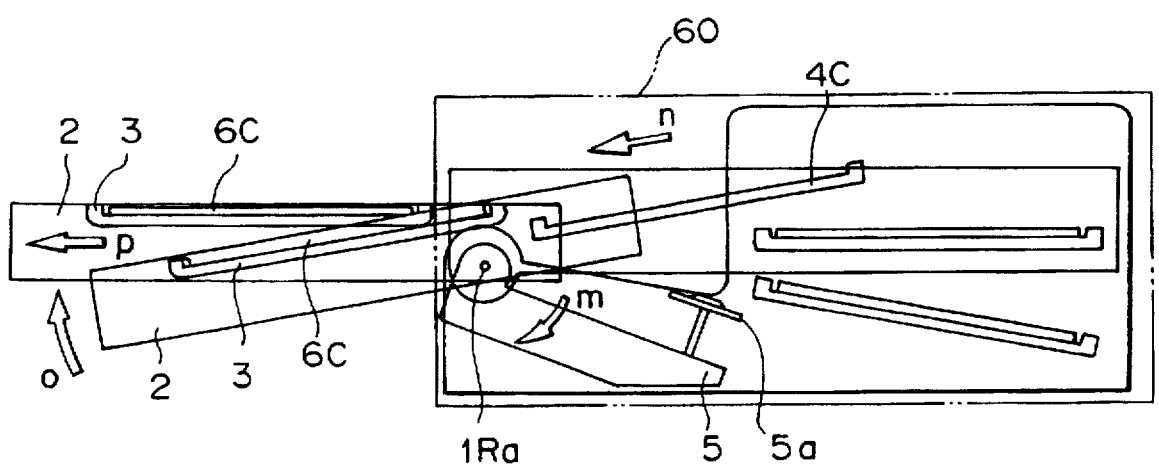
FIG. 22 is an explanatory side view showing disk treating operation in the disk reproducing apparatus in FIG. 1.

FIG. 22 shows operations of the apparatus in a case where the user takes out the disk 6C, which follow or pursue operations of FIGS. 13–17 in the reverse order. Specifically, the disk drive unit 5 descends, and the drawer 2 is driven in a direction of an arrow n, whereby the main tray 3 ascends in the axial direction of the disk to receive the disk 6C from the stock tray 4C. Moreover, the sub-chassis 7 is pivotally or angularly moved in a direction of an arrow o and comes to have a horizontal posture while the drawer 2 is being driven in the direction of the arrow n. The drawer 2 is further driven in a direction of an arrow p, whereby the drawer 2 projects, similarly in FIG. 13 to reach the first position fully drawn out of the casing 60. Thus, the user or operator can take out the disk 6C.

As described above, the disk reproducing apparatus according to the first embodiment of the invention is arranged such that the drawer 2 is inclined selectively to the same kinds or number of inclination angles as the number of disks 6 to be stored, and the drawer 2 and the stock trays 4A, 4B and 4C execute delivering receiving operation of the disk 6 under the inclined state, that the plurality of stock trays 4A–4C storing therein respectively the disks are laminated or stacked upon each other with minimum spacing therebetween and are arranged radially as viewed from the side elevation, and the disks 6 translationally drawn out in accordance with the inclination of each radius together with he stock trays 4A–4C are reproduced while being inclined. Accordingly, the disk storage (stock) housing portion 46 does not need to be moved upwardly and downwardly. A mechanism which is small in vertical size can be realized. Thus, an attempt can be made to reduce the vertical size of the apparatus.

Subsequently, a disk reproducing apparatus according to a second preferred embodiment of the invention will be described with reference to FIGS. 23–37.

A point at which the disk reproducing apparatus according to the second embodiment is the most different from the disk reproducing apparatus according to the first embodiment is that the disk storage (disk stock) portion is not stationary with respect to the main chassis, but is mounted to the main chassis in the form of a stocker 46 pivotally or angularly movable with respect to the main chassis. Due to or related to this different point, the disk reproducing apparatus according to the second embodiment is different in some points from the disk reproducing apparatus according to the first embodiment. However, the disk reproducing apparatus according to the second embodiment is arranged and is operated similarly to the disk reproducing apparatus according to the first embodiment in various points. Accordingly, description will chiefly or principally be made hereinafter, mainly focusing on the different points. In this connection, the drawings of the disk reproducing apparatus according to the first embodiment will be referred to, in a case where the drawings of the apparatus of the second embodiment become substantially the same as the drawings the disk reproducing apparatus according to the first embodiment. Further, components, members or elements of the disk reproducing device according to the second embodiment, which substantially correspond to the components, members or elements of the disk reproducing device according to the first embodiment are denoted by the same reference numerals or symbols (reference numbers or signs) as the corresponding components, members or elements of the disk reproducing device according to the first embodiment.

Figure 1:
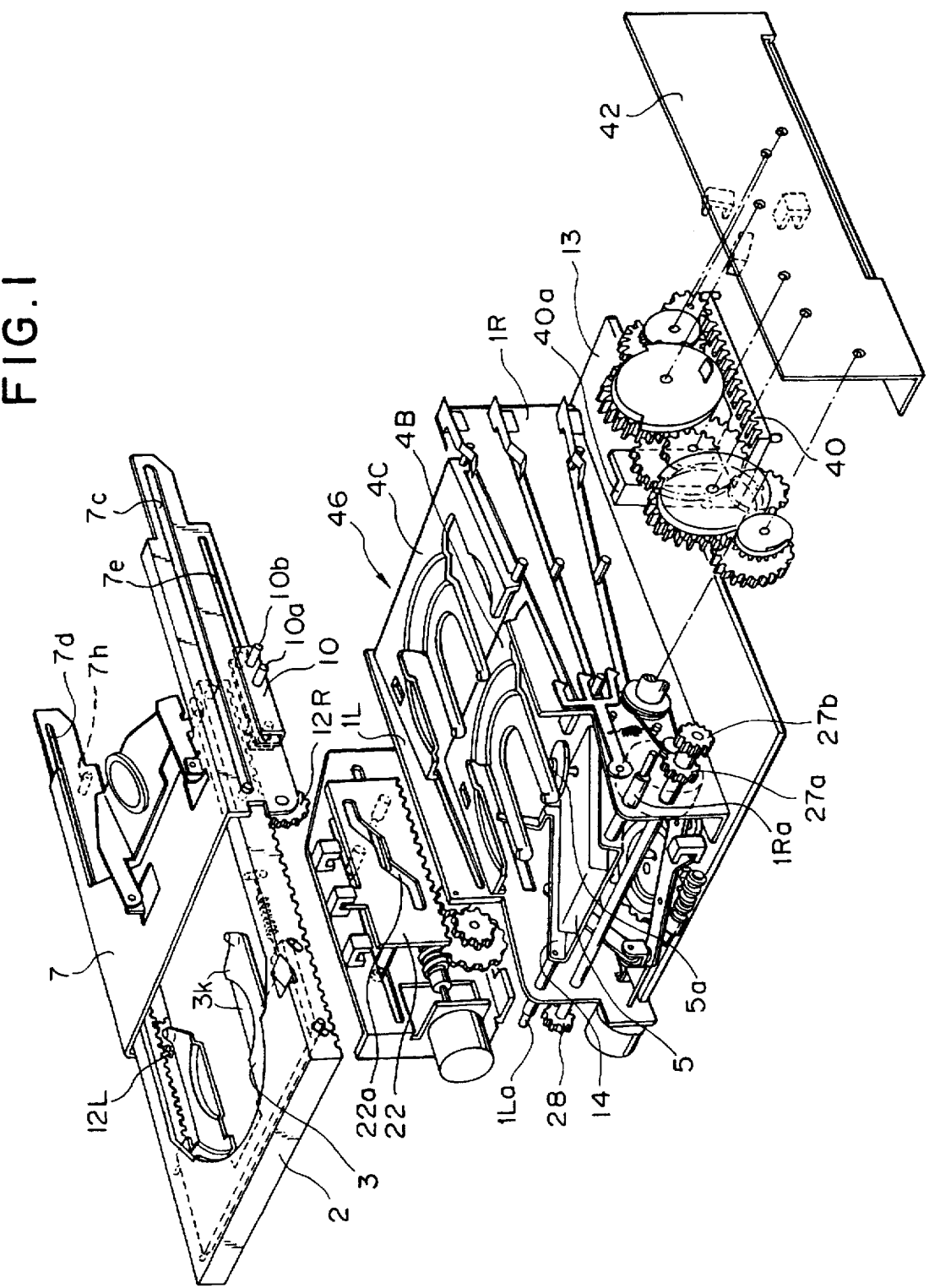
FIG. 1 is an exploded perspective view, showing main structure, of a disk reproducing apparatus according to a first embodiment of the invention.
Figure 23:
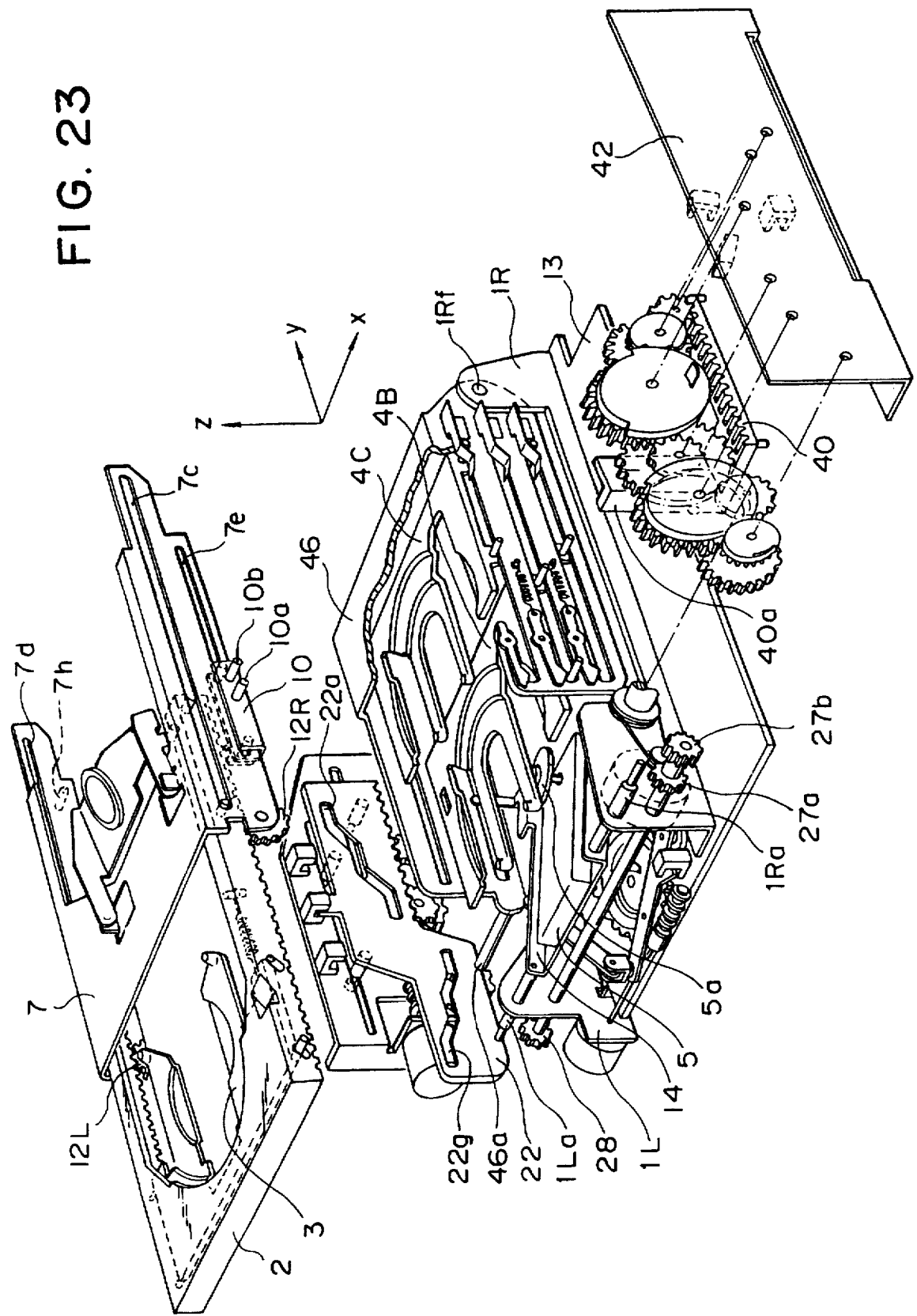
FIG. 23 is an exploded perspective view showing main structure, of a disk reproducing apparatus according to a second embodiment of the invention.
Figure 24:
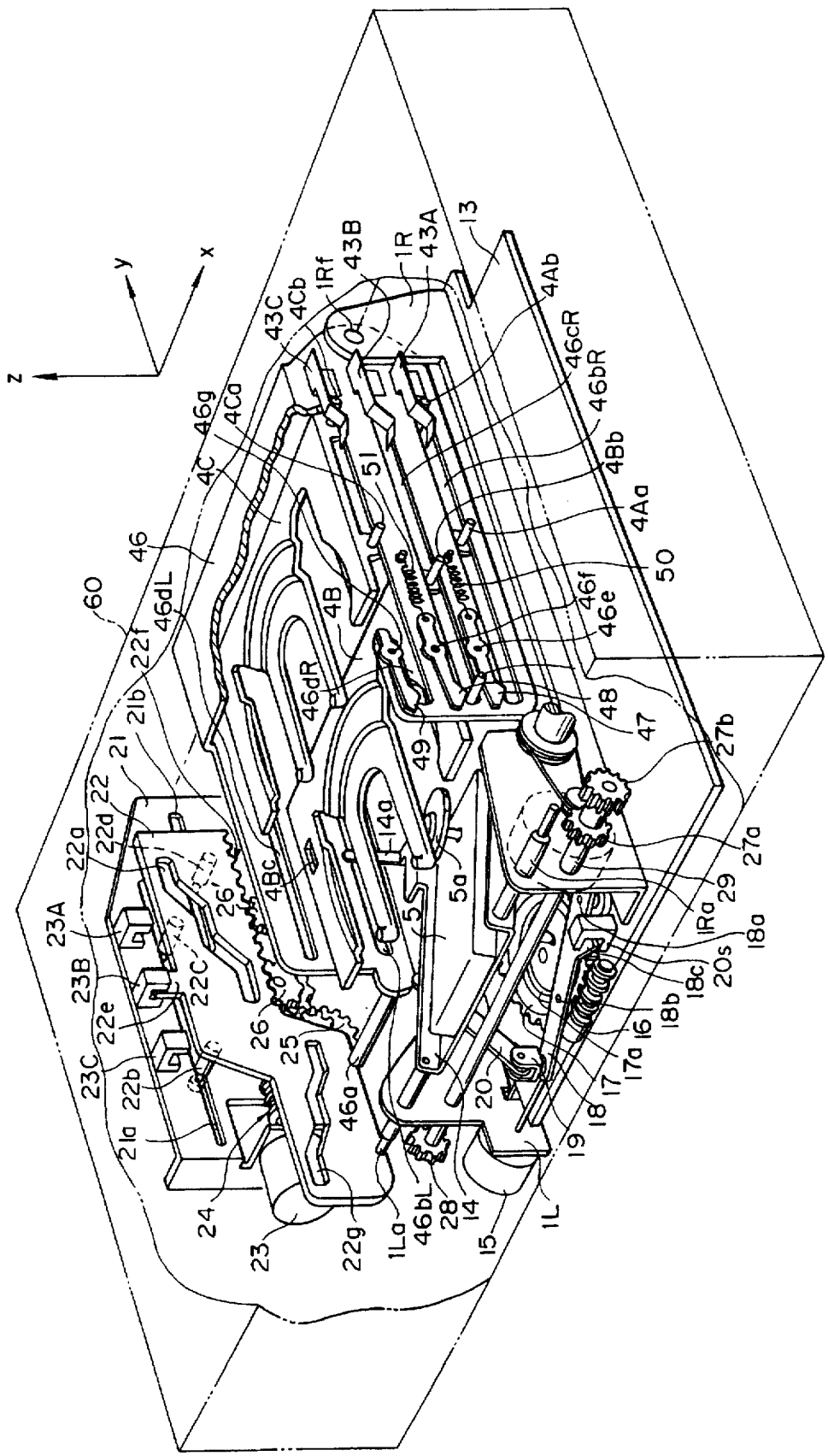
FIG. 24 is an exploded perspective view, showing principally a sub-chassis angular movement (pivotal) mechanism and a disk-drive-unit elevation mechanism, of the disk reproducing apparatus in FIG. 23.

FIG. 23 corresponds to FIG. 1 and is an exploded perspective view showing the whole structure of the disk reproducing device according to the second embodiment, and FIG. 24 is an explanatory view of the second embodiment corresponding to FIG. 3. In this connection, FIG. 2 of the first embodiment is applied to the second embodiment as it is.

The side chassis 1R has a fulcrum or pivot 1Rf. Similarly, the side chassis 1L has a fulcrum or pivot (not shown), and supports the stocker 46 for pivotal or angular movement around the pivot axis parallel to the angular movement or pivot shaft (the shafts 1Ra and 1La) of the sub-chassis 7.

The three stock trays 4A (not shown), 4B and 4C on which the disks are mounted to be stored have the same shape or form. The stock tray 4C will be described as an example of the stock trays. The stock tray 4C has the two projections 4Ca and 4Cb on the side facing to the side chassis 1R. The two projections are slidably supported by an elongated groove 46dR in the stocker 46. Similarly, the stock tray 4C has two projections (not shown) on the side facing to the side chassis 1L. The two projections are slidably supported by an elongated groove 46dL in the stocker 46. By such support structure, the stock tray 4C is movable with respect to the stocker 46 in the direction of the elongated grooves 46dR and 46dL. The structure is similar to that of each of the other two stock stays 4A (not shown) and 4B.

Three pairs of elongated grooves are arranged so that three stock trays are in parallel to the pivotal or angular movement shaft of the stocker 46. In this connection, the drawing shows that the stock trays are generally in parallel to each other. However, it is unnecessary that the stock trays are in parallel to each other.

The three leaf springs 43A, 43B and 43C are fixed to the stocker 46. The leaf springs 43A, 43B and 43C capture respectively the projections 4Ab, 4Bb and 4Cb on the stock trays 4A (not shown), 4B and 4C, whereby it is possible to retain the stock trays 4A (not shown), 4B and 4C at the interior ends of their respective movement ranges or strokes. In this connection, when a disk loading mechanism to be described later forcibly moves the stock trays 4a (not shown), 4B and 4C, the leaf springs 43A, 43B and 43C are resiliently deflected to release the stock trays 4A (not shown), 4B and 4C. Similarly, in a case where the disk loading mechanism moves the stock trays 4A (not shown), 4B and 4C from this (front or outer) side of the movement range to the interior end thereof, the leaf springs 43A, 43B and 43C are resiliently deflected to capture the stock trays 4A (not shown), 4B and 4C.

Moreover, hooks 47, 48 and 49 are so provided on the stocker 46 as to be biased respectively by coil springs 50 and 51 and a similar spring (not shown) for the hook 49. The hooks 47, 48 and 49 cam capture or engage with the projections 4Aa, 4Ba and 4Ca on the stock trays 4A (not shown), 4B and 4C, respectively, to retain the stock trays 4A (not shown), 4B and 4C at these side (front or forward) ends of the respective movable ranges or strokes. However, when the disk loading mechanism to be described later forcibly moves the stock trays 4A (not shown), 4B and 4C, the coil springs 50 and 51, and a similar spring (not shown) for the hook 49 resiliently expand to release the stock trays 4A (not shown), 4B and 4C. Similarly, in a case where the disk loading mechanism moves the stock trays 4A (not shown), 4B and 4C from the interior (rear or remote) end of the movement range to this side end thereof, these coil springs resiliently expand to capture or engage with the stock trays 4A (not shown), 4B and 4C.

In FIG. 24, a pivotal or angular-movement control mechanism for the sub-chassis 7 will be described. The step cam 22 has a cam groove 22g. The cam groove 22g has three horizontal regions different in height from each other, and two inclined regions which connect them to each other smoothly. A projection 46a on the stocker 46 is guided by the cam groove 22g, whereby the stocker 46 is angularly or pivotally moved according to the movement of the step cam 22. When the projection 46a is in any one of the three horizontal regions of the cam groove 22g, the stocker 46 takes stably a predetermined posture.

The projection 7h and the projection 46a ascend and descend substantially simultaneously through steps of respective cam grooves according to the movement of the state cam 22. When the projection 7h is present in the uppermost horizontal region of the cam groove 22a, the projection 46a is present in the lowermost horizontal region the cam groove 22g, so that the main tray 3 and the stock tray 4C are in parallel to each other. When the projection 7h is present in the intermediate horizontal region of the cam groove 2a, the projection 46a is present in the intermediate horizontal region of the cam groove 22g, so that the main tray 3 and the stock tray 4B are in parallel to each other. When the projection 7h is present in the lowermost horizontal region of the cam groove 22a, the projection 46a is present in the uppermost horizontal region of the cam groove 22g, so that the main tray 3 and the stock tray 4A (not shown) are in parallel to each other.

The step cam 22 has, at a lower end thereof, the horizontal rack (gear) 22f. A drive force of the motor 23 mounted on the step cam holder 21 is transmitted to the rack 22f through the worm 24, the worm wheel 25 and the gears 26 and 26'. Thus, the step cam 22 is moved.

The shutter 22e at an upper end of the step cam 22 screens successively (three optical axes of) three photo-sensors fixed to the step cam holder 21, according to the movement of the step cam 22. The positions of the three photo-sensors are set such that, when each of the projections 7h and 46a are present in respective one of three horizontal regions of the cam grooves 22a and 22g, the optical axis is screened by the shutter 22e. Accordingly, depending upon the fact as to which of the three photo-sensors is screened, three postures of the sub-chassis 7 and the stocker 46 are judged or discriminated.

Subsequently, the disk loading mechanism will be described with reference to FIG. 25.

The slider 10 is related to the stock tray as follows.

In a case where the slider 10 is positioned at the interior end of the elongated groove e in the sub-chassis 7, and where the three stock trays are positioned at the interior ends of the longitudinal grooves 46bR, 46cR and 46dR in the stocker 46, the projection 10c of passes through this side of the projections 4Aa, 4Ba and 4Ca of the three respective stock trays while the projection 10d passes simultaneously through the interior side, when the sub-chassis 7 and the stocker 46 are pivoted or moved angularly to change their inclined angle two projections on the slider 10. In a case where the projection 7h on the sub-chassis 7 and the projection 46a on the stocker 46 are present in the respective horizontal regions of the cam grooves 22a and 22g, the projection (4Aa or 4Ba or 4Ca) on the stock tray is received between the two projections 10c and 10d on the slider 10.

In a case where the slider 10 is positioned at the forward (front) end of the elongated groove e in the sub-chassis 7, and where any one of the three stock trays is positioned at the forward end of the elongated grooves 46bR, 46cR and 46dR in the stocker 46, the projection 10c of the two projections on the slider 10 passes through this side of the projection (4Aa or 4Ba or 4Ca) at the forward end of the stock tray while, the projection 10d passes through the interior side, when the sub-chassis 7 and the stocker 46 are moved angularly or pivotally to change the inclined angle thereof. In a case where the projection 7h on the sub-chassis 7 and the projection 46a on the stocker 46 are present in the respective horizontal regions of the cam grooves 22a and 22g, the projection (4Aa or 4Ba or 4Ca) on the stock tray is received between the two projections 10c and 10d on the slider 10.

Due to the above-described relation among the longitudinal rib 40a on the rack 40, the slider 10 and the projection 4Aa or 4Ba or 4Ca, when the projection 7h on the sub-chassis 7 and the projection 46a on the stocker 46 are in the respective horizontal regions of the step grooves, one stock tray is moved through the full stroke or length of the elongated groove in the stocker according to the movement of the rack 40. Specifically, the stock tray is moved through the full stroke of the elongated groove in the stocker, by the drive force of the cam gear 36.

Now, the relation between the cam gear 35 and the smaller cam gear 37 which drive the drawer 2, and the cam gear 36 and the smaller cam gear 38 which drive the stock tray will be described.

The cam gears 35 and 36 are constantly rotated, during a whole operation process starting from a state where the drawer 2 fully projects from the sub-chassis 7, through a state where the drawer 2 fully enters the interior end of the sub-chassis 7, further, to a state where stock tray having been positioned at the forward end of the stocker 46 is stored into the interior end. A velocity ratio or gear ratio of a series of gears is set such that the whole operation process is completed within one revolution of each of the cam gears 35 and 36.

Similarly to the case of the first embodiment, the cam gear 35 has an outer peripheral cam shape 35b and has a smaller or narrower tooth width in a specific angular range of the gear part 35a not be engaged with the gear part 37a of the smaller cam gear 37, while the smaller cam gear 37 has also the outer peripheral cam shape 37b. Thus, the smaller cam gear 37 is not rotated when the cam gear 35 is rotated through the specific angular range.

Moreover, similarly to the case of the first embodiment, the cam gear 36 has the outer peripheral cam shape 36b and has a smaller or narrower tooth width in a specific angular range of the tear part 36a not to be engaged with the gear part 38a of the smaller cam gear 38, while the smaller cam gear 38 has also the outer peripheral cam shape 38b. Thus, the smaller cam gear 38 is not rotated when the cam gear 36 is rotated through the specific angular range.

The apparatus thus constructed is adapted such that, by setting or adjusting appropriately timings of rotations and stoppages of the respective smaller cam gears 37 and 38, the period of time during which only the drawer 2 is moved, the period of time during which none of the drawer 2, and the stock trays is moved, and the period of time during which only the stock tray is moved occur successively. Further, under the above-mentioned condition that the cam gears 35 and 36 continue to be rotated over the whole period, the shutter 36c is provided on the cam gear 36, and the gear holder 42 is provided with the three photo-sensors 41A, 41B and 41C, whereby making it possible to judge or discriminate three states, i.e. a state in which the drawer 2 is fully drawn out from the sub-chassis 7, a state in which the drawer 2 is fully inserted to be stored, and one of the stock trays protrudes out to the forward end of the stocker 46 so that both are not moved, and a state in which all the stock trays are fully inserted to be stored at the interior end can be judged.

Now, disk delivering/receiving operation between the drawer 2 and the stock trays 4A, 4B and 4C will be described.

Figure 26:
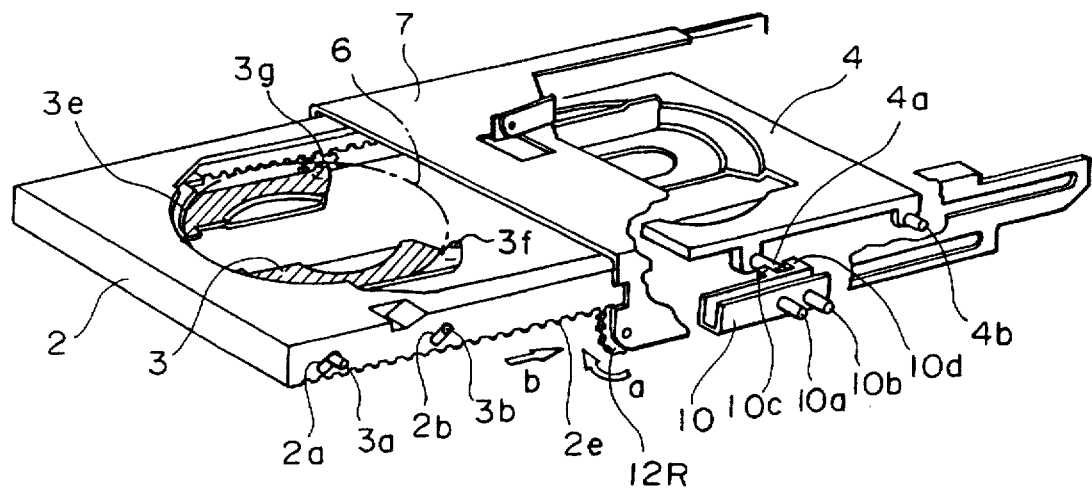
FIG. 26 is a perspective view showing delivering/receiving operation or action, of a disk having the standard diameter, by a main tray and a stock tray in the disk reproducing apparatus in FIG. 23.

FIG. 26 is an explanatory view corresponding to FIG. 5 of the first embodiment, in a case where a disk having a standard diameter is used.

More specifically, FIG. 26 shows a state in which, after the user has mounted the disk on the apparatus, the pinion 12R is rotated in the direction of the arrow a, and the rack 2e or the drawer 2 is being driven in the direction of the arrow b. The main tray 3 is positioned at the upper ends of the inclined grooves 2a and 2b in the drawer 2 by the biasing of the coil spring 11 (FIG. 2). The projections 10c and 10d, in the form of a small rib, of the slider 10 supported by the sub-chassis 7 receive therebetween the projection 4a of one stock tray 4 (one of the stock trays 4A, 4B and 4C (FIG. 24)), positioned at the forward end of the stocker 46 (FIG. 24). At this time, the disk 6 is positioned by the step 3e and the projections 3f and 3g on a circular arc of the main tray. The disk mounting surface is shown by oblique lines or hatching.

FIGS. 6–8 and the related description of the first embodiment are also applied to the second embodiment as they are.

Figure 27:
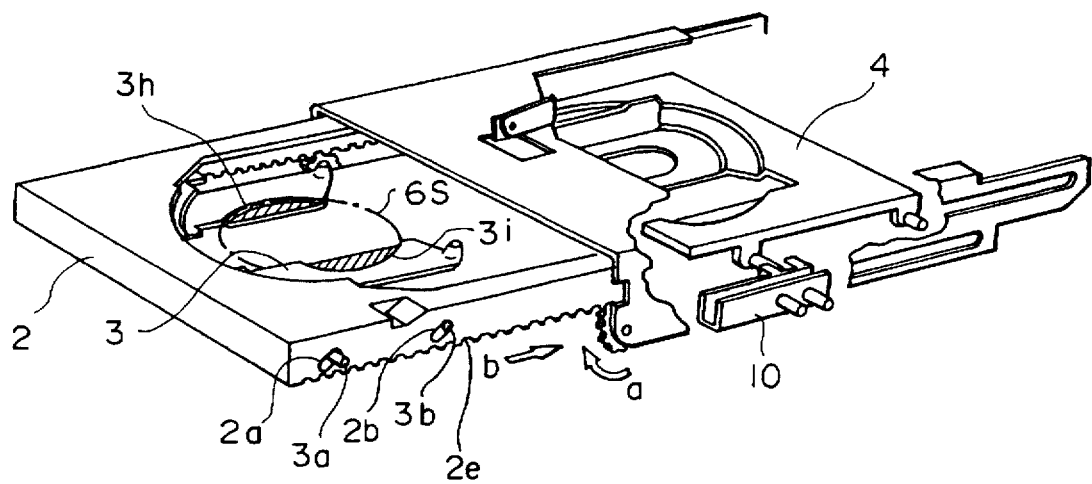
FIG. 27 is a perspective view showing delivering/receiving operation, of the disk having the small diameter, by the main tray and the stock tray in the disk reproducing apparatus in FIG. 23.

FIG. 27 is an explanatory view corresponding to FIG. 9 of the first embodiment, in a case where the disk small in diameter is used. The description of the operation of the apparatus relating to FIG. 9 is also applied to this case as it is.

Moreover, FIGS. 10–12 of the first embodiment and the description thereof are also applied to the second embodiment as they are.

Now, FIGS. 28–37 are referred to for the description the whole operations, i.e. mounting, storing, reproduction, changing and taking-out of the disk, of the disk reproducing device according to the second embodiment.

Figure 28:
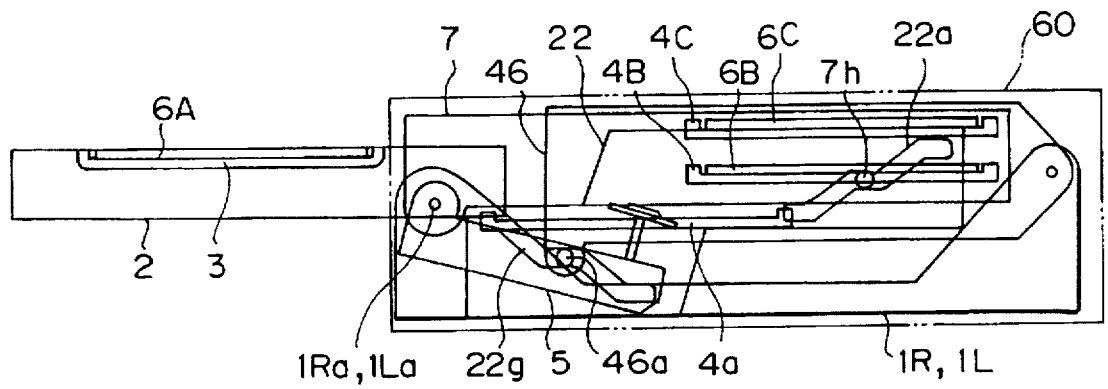
FIG. 28 is a side elevational view showing a part or stage of mounting, storing, reproduction, change and taking-out operations of the disk by the disk reproducing apparatus in FIG. 23.

FIG. 28 corresponds to FIG. 13 of the first embodiment and shows that the drawer 2 is drawn out, i.e. projects, from the sub-chassis 7, and the user has disposed the disk 6A on the main tray 3.

In the second embodiment, at this time, the intermediate horizontal region the cam groove 22a in the step cam 22 supports the projection 7h on the sub-chassis 7, while the intermediate horizontal region of the cam groove 22g in the step cam 22 supports the projection 46a on he stocker 46, so that the photo-sensor 23B (FIG. 24) is screened by the shutter 22e (FIG. 24).

Figure 29:
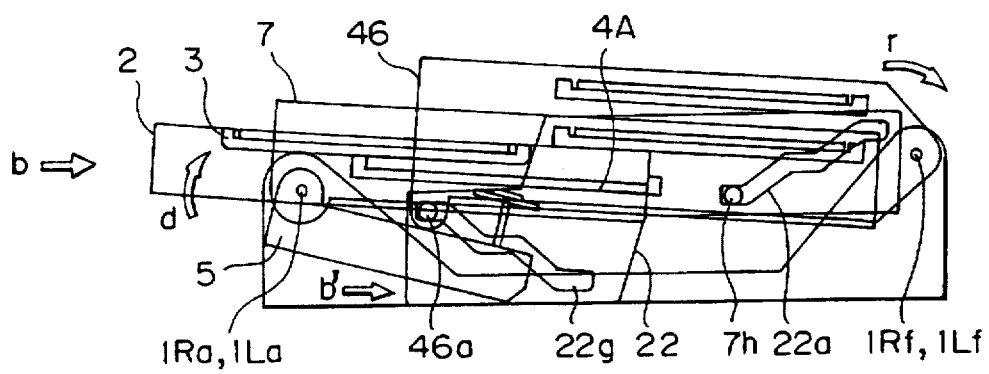
FIG. 29 is a side elevational view showing another part or stage of mounting, storing, reproduction, change and taking-out operations of the disk by the disk reproducing apparatus in FIG. 23.

Subsequently, as shown in FIG. 29 which corresponds to FIG. 14 of the first embodiment, the drawer 2 is inclined according to the pivotal or angular movement of the sub-chassis 7 in the direction of the arrow d on the way of its movement in the direction of the arrow b. Simultaneously, the stocker 46 is pivotted as shown by an arrow u. These operations are produced by a pivotal motion or movement of the step cam 22 as shown by an arrow b'. Specifically, since the control circuit (not shown) having information that the stock tray 4A is set under the waiting state controls the step cam 22 to be moved to a state where the photo-sensor 23A is screened by the shutter 22e, i.e. the state where the lowermost horizontal region of the cum groove 22a in the step cam 22 supports the sub-chassis 7 and where the uppermost horizontal region of the cam groove 22g supports the stocker 46.

Figure 30:
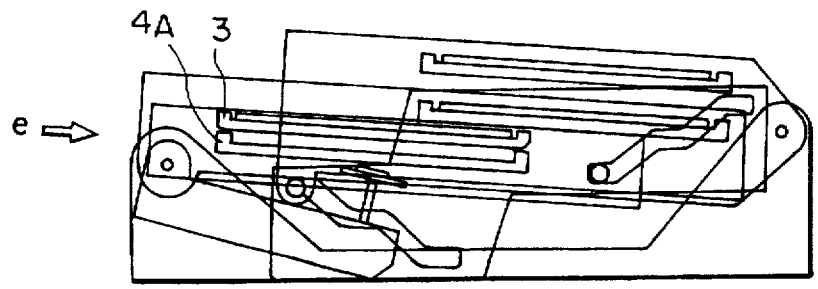
FIG. 30 is a side elevational view showing still another part of mounting, storing, reproduction, change and taking-out operations of the disk by the disk reproducing apparatus in FIG. 23.

FIG. 30 corresponding to FIG. 15 of the first embodiment shows a state in which, after the inclining operation has been completed, the drawer 2 is further driven in the direction of the arrow e so that the main tray 3 is overlapped over the stock tray 4A. This corresponds to a state of FIG. 6 or FIG. 10.

Figure 31:
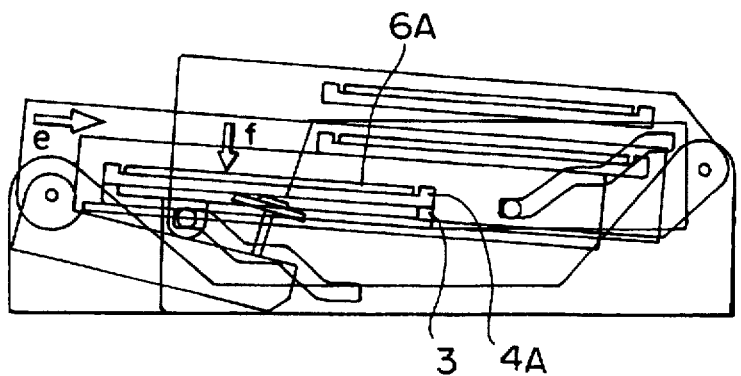
FIG. 31 is a side elevational view showing still another part of mounting, storing, reproduction, change and taking-out operations of the disk by the disk reproducing apparatus in FIG. 23.

FIG. 31 corresponding to FIG. 16 of the first embodiment shows a state in which the drawer 2 is further driven in the direction of the arrow e so that the main tray 3 descends, as shown by the arrow q, down below the stock tray 4A. This corresponds to a state of FIG. 7 or FIG. 11. The disk 6SA is transferred to or mounted on the stock tray 4A.

Simultaneously, the clamp holder 8 of FIG. 2 descends according to the movement of the drawer 2 in the direction of the arrow e, and the disk damper 9 approaches the disk.

Figure 25:
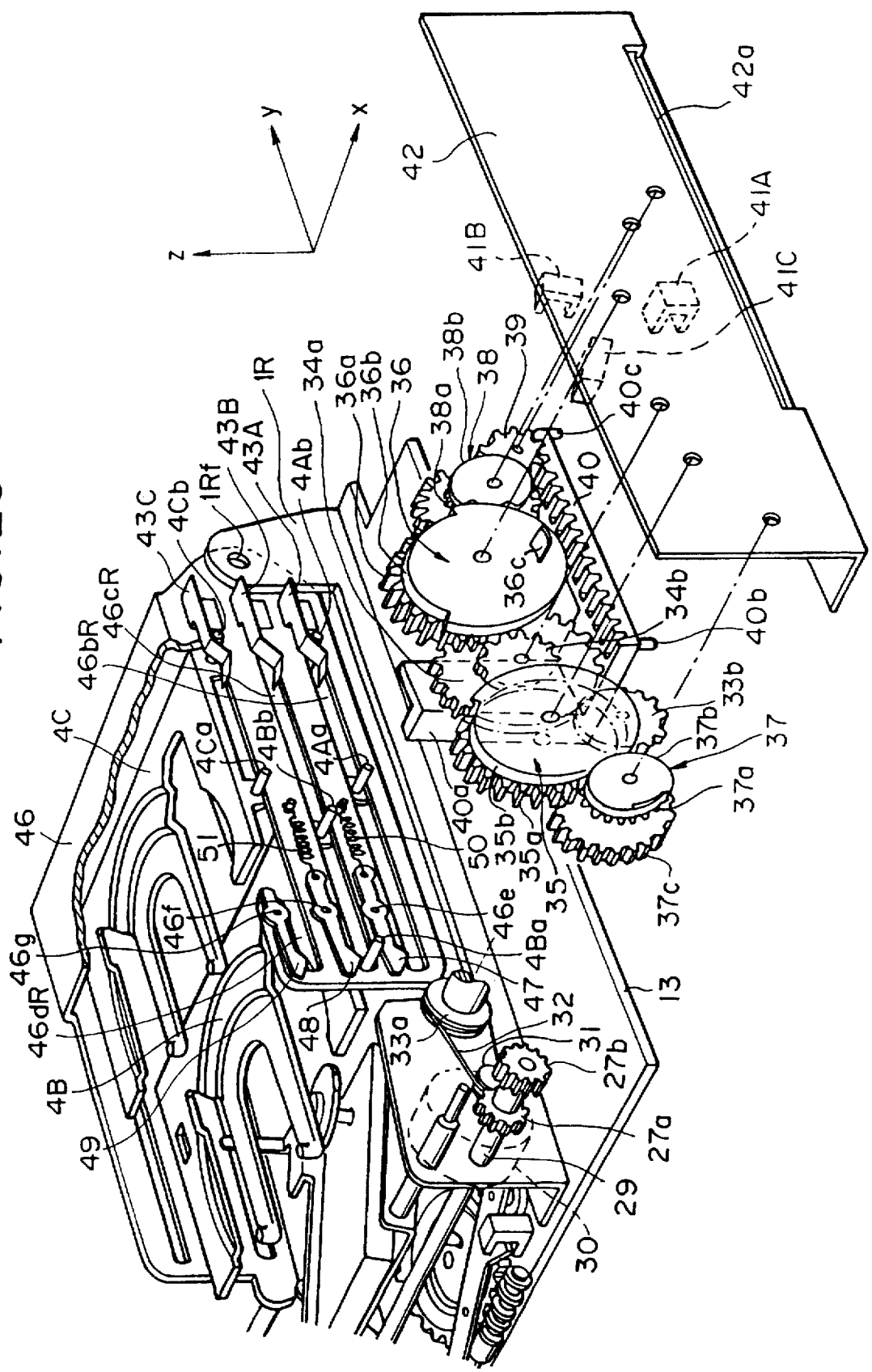
FIG. 25 is an exploded perspective view, showing principally a disk loading mechanism, of the disk reproducing apparatus in FIG. 23.

Similarly to FIGS. 13 to 16 of the first embodiment, in the above-described course or processes of FIGS. 28–31, the gear part of the smaller cam gear 37 shown in FIG. 25 continues to be in mesh with the gear part of the cam gear 35. Thus, the smaller cam gear 37 is continuously rotated. On the other hand, since the smaller cam gear 38 faces the narrow tooth width range of the cam gear 36, the gear part thereof is not engaged therewith. Since the outer peripheral cam 36b of the cam gear 36 and the outer peripheral cam 38b of the smaller cam gear 38 prevent the rotation of the smaller cam gear 38, the small cam gear 38 is not rotated.

Figure 32:
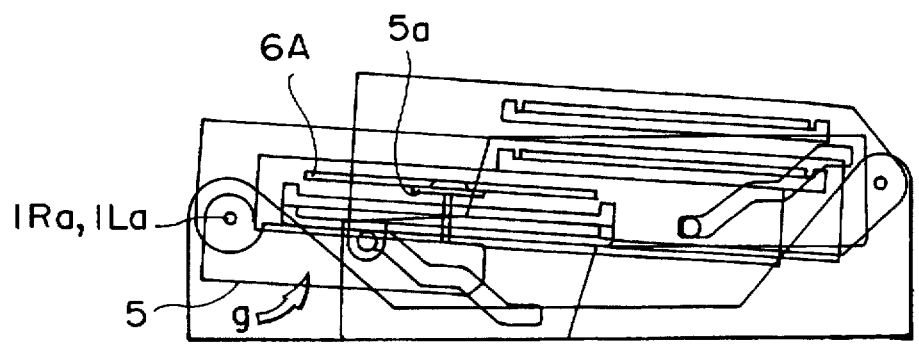
FIG. 32 is a side elevational view showing still another part of mounting, storing, reproduction, change and taking-out operations of the disk by the disk reproducing apparatus in FIG. 23.

FIG. 32 shows a state corresponding to FIG. 17 of the first embodiment.

Figure 33:
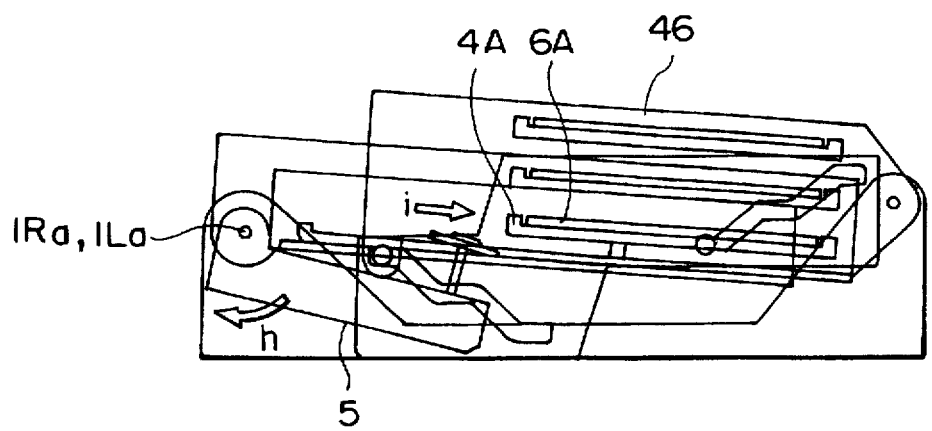
FIG. 33 is a side elevational view showing still another part of mounting, storing, reproduction, change and taking-out operations of the disk by the disk reproducing apparatus in FIG. 23.

FIG. 33 corresponds to FIG. 18 of the first embodiment, and shows a state in which, due to instruction or command by the user (operator) to stop the reproduction of the disk, the disk drive unit 5 descends as shown by the arrow h hand, further, the stock, tray 4A with the disk 6A thereon is moved to the interior end of the stocker 46, that is, the state in which storing of the disk 6A has been completed.

Figure 34:
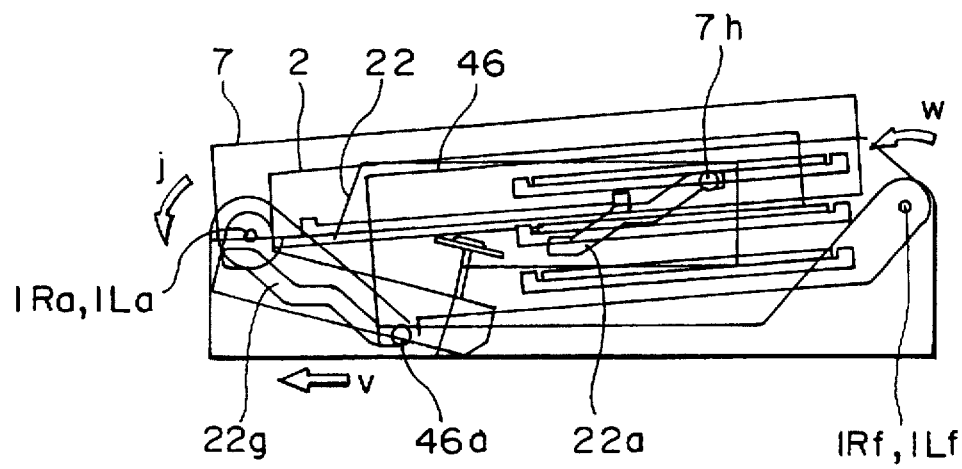
FIG. 34 is a side elevational view showing still another part of mounting, storing reproduction, change and taking-out operations of the disk by the disk reproducing apparatus in FIG. 23.
Figure 35:
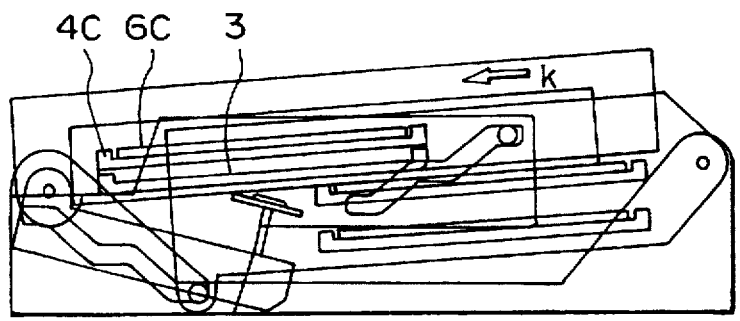
FIG. 35 is a side elevational view showing still another part of mounting, the storing, reproduction, change and taking-out operations of the disk by the disk reproducing apparatus in FIG. 23.
Figure 36:
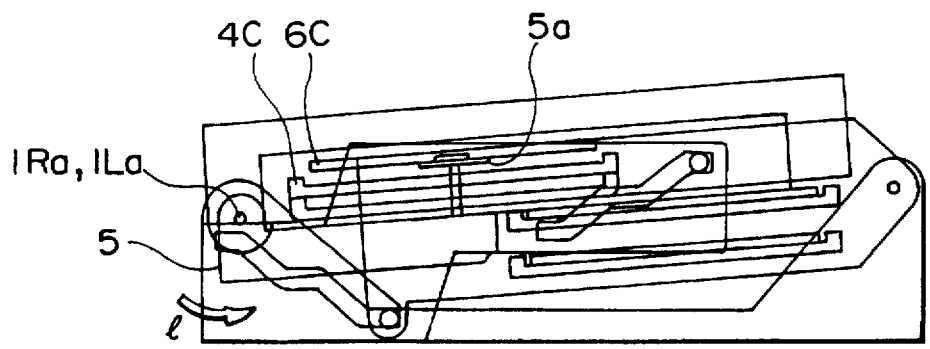
FIG. 36 is a side elevational view showing still another part of mounting, the storing, reproduction, change and taking-out operations of the disk by the disk reproducing apparatus in FIG. 23.

FIGS. 34–36 correspond to FIGS. 19–21 of the first embodiment, and show operation of the apparatus in a case where the user instructs to reproduce the disk 6C stored in the stock tray 4C, that is, changing operation of the disk.

In FIG. 34, the control circuit (not shown) controls to drive the step cam 22 in a direction of an arrow v, so that the uppermost horizontal region of the cam groove 22a in the step cam 22 supports the sub-chassis 7, and the lowermost horizontal region of the cam groove 22g supports the stocker 46, that is, so that the shutter 22e in FIG. 24 screens the photo-sensor 23C. At this process, the sub-chassis 7 is moved pivotally or angularly as shown by the arrow 1, and the stocker 46 is moved pivotally or angularly as shown by an arrow w.

In FIG. 35, the control circuit (not shown) controls to rotate the motor 30 of FIG. 25 reversely to the direction shown in FIGS. 28–31, and to move the stock tray 4C in the direction of the arrow k. Similarly to the case of FIG. 31, the control circuit (not shown) detects by the screening of the photo-sensor 41B that neither the smaller cam gear 37 nor the smaller cam gear 38 is rotated any longer, and stops driving. At this time, the stock tray 4C is superposed or aligned over the main tray 3.

Similarly to a case of FIG. 32, FIG. 36 shows that the disk drive unit 5 ascends as shown by the arrow l, and the turntable 5a receives the disk 6C to lift the same from the stock tray 4C. Operation of the apparatus in which the disk drive unit 5 ascends and stops is as has been described in connection with FIG. 17 of the first embodiment corresponding to FIG. 32.

Figure 37:
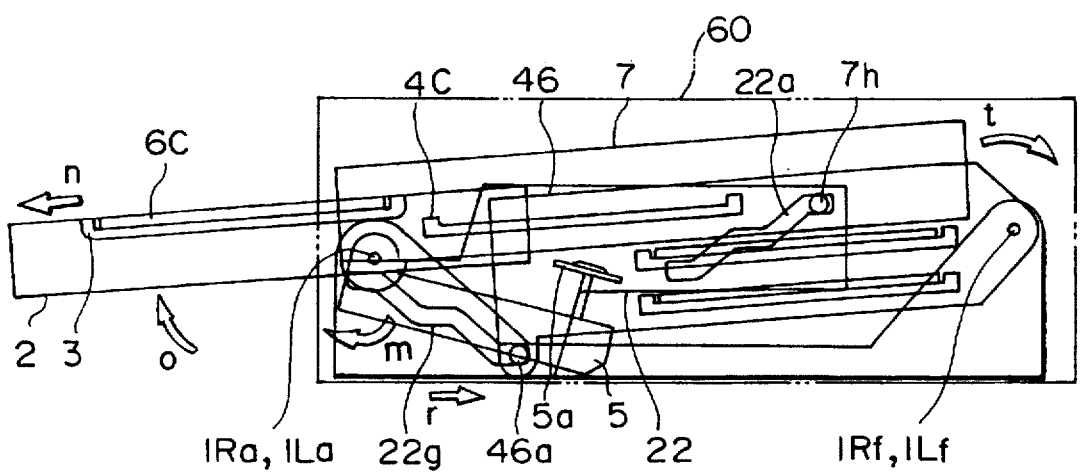
FIG. 37 is a side elevational view showing still another part of mounting, storing, reproduction change and taking-out operations of the disk by the disk reproducing apparatus in FIG. 23.
Figure 38:
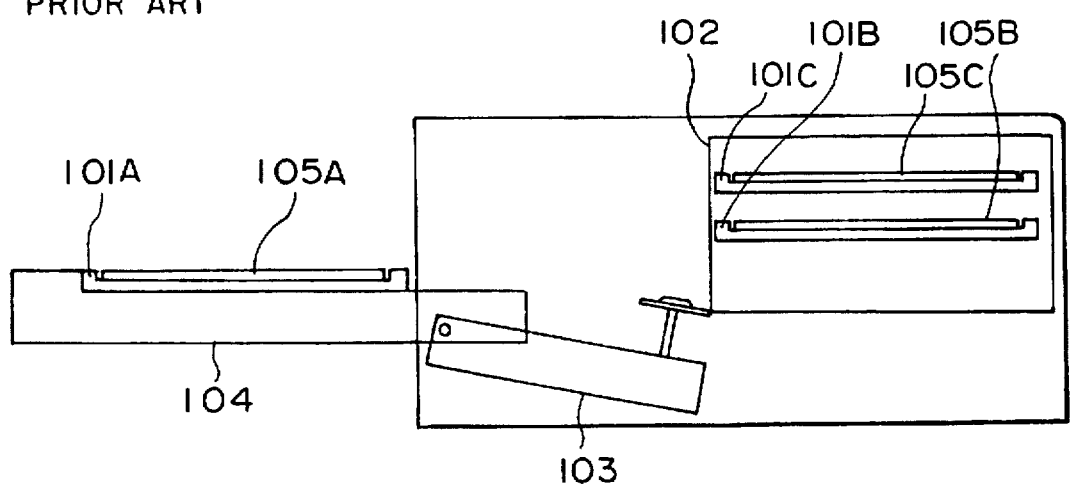
FIG. 38 is a schematic side elevational view of conventional disk reproducing device in a state where a drawer is drawn out.
Figure 39:
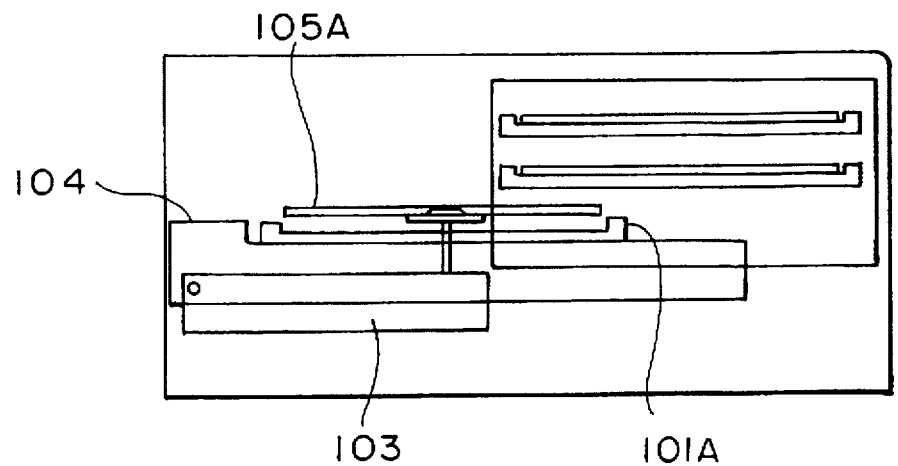
FIG. 39 is a schematic side elevational view of the conventional disk reproducing device in a state where a disk is reproduced by a tray at the lowermost layer or stage of a stocker.
Figure 40:
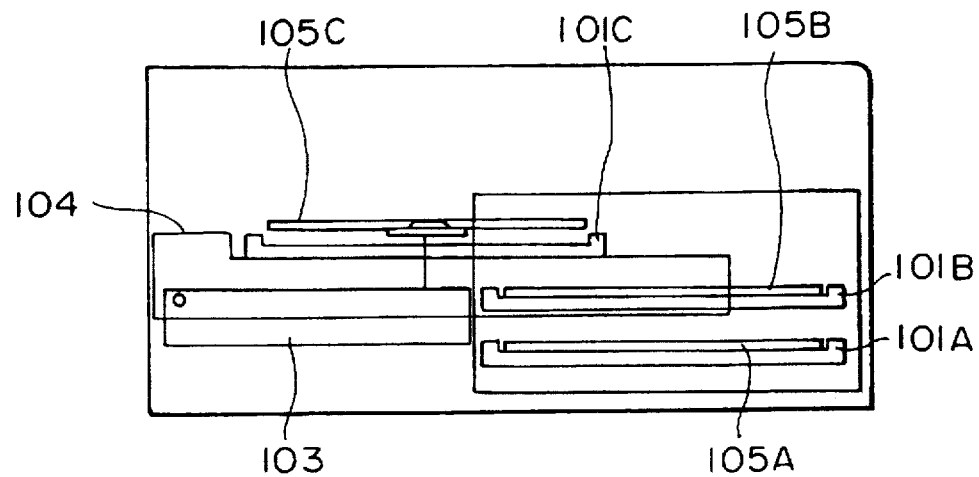
FIG. 40 is a schematic side elevational view of the conventional disk reproducing device in a state where the disk is reproduced by the tray at the uppermost stage or layer of the stocker.

FIG. 37 corresponds to FIG. 22 of the first embodiment and shows the operation of the apparatus where the user takes out the disk 6C. The operations proceeds in the reverse order of the operations from the aforesaid FIGS. 28–32. Specifically, the disk drive unit 5 descends as shown by the arrow m, and the drawer 2 is driven in the direction of the arrow n, whereby the main tray 3 ascends in the axial direction of the disk, to receive the disk 6C from the stock tray 4C. Furthermore, on the way of the driven movement of the drawer 2 in the direction of the arrow n, the step cam 22 is moved in the direction of an arrow r. The sub-chassis 7 is angularly or pivotally moved in a direction of an arrow o, and the stocker 46 is moved angularly or pivotally in a direction of an arrow t, whereby, similarly to FIG. 28, the drawer 2 projects horizontally, so that the disk can be taken out by the user or operator.

The heights and the positions of the centers of angular or pivotal movements can suitably be selected in accordance with desired designs of the products. In the second embodiment, however, the center of angular or pivotal movement of the sub-chassis is provided at the position substantially half the thickness of the sub-chassis. Moreover, the center of angular or pivotal movement of the stocker is provided at a position substantially half the thickness (height) of the stocker. The centers of angular or pivotal movements of both members are positioned to become substantially the same height with respect to a reference surface of the main chassis. Therefore, it has been made possible to minimize the heights of the products.

As described above, in the disk reproducing apparatus according to the second embodiment, the drawer 2 and the stocker 46 are selectively inclined to the same plural numbers or kinds of (inclined) states as the number of the disk 6 to be stored, the drawer 2 and the stock tray 4 deliver/receive, i.e. transfer, the disk 6 with each other under the inclined state, and the disk 6 is reproduced while being inclined, whereby the casing of the stocker 46 serving as the storage of the disk 6 does not need to be moved vertically. Thus, the size or dimension of the whole apparatus in the vertical direction can be reduced.

What is claimed is:

1. A disk reproducing apparatus comprising:

a drawer having a disk mounting portion thereon, the drawer being capable of disposing a disk thereon while positioned outside of the disk reproducing apparatus when the disk is not disposed on the drawer and being translationally movable between a first position where the disk is removed from the drawer and a second position within the disk reproducing apparatus, the drawer being capable of selectively taking plural inclined postures of plural kinds of angles relative to a direction parallel to a depthwise direction of the disk reproducing apparatus, disk reproducing means being positioned near the second position, the disk reproducing means being capable of reproducing the disk when the drawer, on which the disk is disposed, is present in the second position, and a stocker having plural disk receiving layers capable of storing therein plural disks substantially in a laminar form in a thickness direction of the disks and being positioned at a location adjacent to the second position within the disk reproducing apparatus, each of the disk receiving layers being arranged such that each of the intervals between the disk receiving layers is radially diverged from the proximal side of the stocker, which is near the second position, toward the distal side of the stocker, which is far away from the second position, as viewed from a side elevation, the stocker being fixedly secured to the disk reproducing apparatus, the disk receiving layers being disposed such that one specified disk receiving layer among the disk receiving layers, in response to the inclined postures of the drawer, is parallel and close to the disk mounting portion of the drawer thereby allowing delivering and receiving of the disk to be performed between the disk mounting portion of the drawer and the stocker, wherein the drawer being inclined to an angle equal to an inclined angle of a subject disk which is received in a predetermined position of the stocker and is taken out from the predetermined position of the stocker, relative to a direction parallel to a depthwise direction of the disk reproducing apparatus, simultaneously with or halfway through a translational movement between the first position and the second position when storing the subject disk in the stocker and taking out the subject disk from the stocker, whereby the subject disk is adapted to be movable between the first position and the second position and capable of reproducing the disk by the disk reproducing means while remaining in the inclined posture so as to enable the reduction of the vertical size of the disk reproducing apparatus.

2. A disk reproducing apparatus according to claim 1, wherein the stocker has plural stock trays each of which is capable of carrying one disk thereon, each of the stock trays having a disk mounting portion where a disk is disposed and being translationally movable in a direction perpendicular to the thickness direction of the disk, between an interior of the stocker and the second position.

3. A disk reproducing apparatus according to claim 2, wherein, the disk mounting portion of the drawer and the stock tray have such shapes that they are not overlapped with each other in the thickness direction of the disk, when the disk mounting portion of the drawer and the stock tray are present in the second position, and wherein the drawer or at least the disk mounting portion of the drawer is translated in the thickness direction of the disk relative to the stock tray, between a position in which a disk mounting surface of the disk mounting portion of the drawer is higher than a disk mounting surface of the stock tray of the stocker, and a position in which the disk mounting surface of the disk mounting portion of the drawer is lower than the disk mounting surface of the stock tray of the stocker so that delivering and receiving of the disk is performed between the disk mounting portion of the drawer and the stock tray.

4. A disk reproducing apparatus comprising:

a drawer having a disk mounting portion thereon, the drawer being capable of disposing a disk thereon while positioned outside of the disk reproducing apparatus when the disk is not disposed on the drawer and being translationally movable between a first position where the disk is removed from the drawer and a second position within the disk reproducing apparatus, the drawer being capable of selectively taking plural inclined postures of plural kinds of angles relative to a direction parallel to a depthwise direction of the disk reproducing apparatus, disk reproducing means being positioned near the second position, the disk reproducing means being capable of reproducing the disk when the drawer, on which the disk is disposed, is present in the second position, and a stocker having plural disk receiving layers capable of storing therein plural disks substantially in a laminar form in a thickness direction of the disks and being positioned at a location adjacent to the second position within the disk reproducing apparatus, the stocker being interlockingly pivoted in response to the change of the inclined postures of the drawer, one specified disk receiving layer, among the disk receiving layers, in response to the selected inclined postures of the drawer, being parallel and close to the disk mounting portion of the drawer thereby allowing delivering and receiving of the disk to be performed between the disk mounting portion of the drawer and the stocker, wherein the drawer being inclined clockwise or counterclockwise to an angle equal to an inclined angle of a subject disk which is received in a predetermined position of the stocker and is taken out from the predetermined position of the stocker, relative to a direction parallel to a depthwise direction of the disk reproducing apparatus, simultaneously with or halfway through a translational movement between the first position and the second position when storing the subject disk in the stocker and taking out the subject disk from the stocker, the stocker being inclined counterclockwise or clockwise by an angle equal to the inclined angle of the subject disk relative to a direction parallel to the depthwise direction of the disk reproducing apparatus simultaneously with the movement of the drawer, whereby the subject disk is adapted to be movable between the first position and the second position and capable of reproducing the disk by the disk reproducing means while remaining in the inclined posture so as to enable the reduction of the vertical size of the disk reproducing apparatus.

5. A disk reproducing apparatus according to claim 4, wherein the stocker has plural stock trays each of which is capable of carrying one disk thereon, each of the stock trays having a disk mounting portion where a disk is disposed and being translationally movable in a direction perpendicular to the thickness direction of the disk, between an interior of the stocker and the second position.

6. A disk reproducing apparatus according to claim 5, wherein, the disk mounting portion of the drawer and the stock tray have such shapes that they are not overlapped with each other in the thickness direction of the disk, when the disk mounting portion of the drawer and the stock tray are present in the second position, and wherein the drawer or at least the disk mounting portion of the drawer is translated in the thickness direction of the disk relative to the stock tray, between a position in which a disk mounting surface of the disk mounting portion of the drawer is higher than a disk mounting surface of the stock tray of the stocker, and a position in which the disk mounting surface of the disk mounting portion of the drawer is lower than the disk mounting surface of the stock tray of the stocker so that delivering and receiving of the disk is performed between the disk mounting portion of the drawer and the stock tray.

* * * * *